United States Patent
Wei et al.

(10) Patent No.: US 12,400,332 B2
(45) Date of Patent: Aug. 26, 2025

(54) METHOD AND APPARATUS FOR PERFORMING LAYER SEGMENTATION ON TISSUE STRUCTURE IN MEDICAL IMAGE, DEVICE, AND MEDIUM

(71) Applicant: Tencent Technology (Shenzhen) Company Limited, Shenzhen (CN)

(72) Inventors: Dong Wei, Shenzhen (CN); Donghuan Lu, Shenzhen (CN); Hong Liu, Shenzhen (CN); Yuexiang Li, Shenzhen (CN); Kai Ma, Shenzhen (CN); Yefeng Zheng, Shenzhen (CN); Liansheng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 468 days.

(21) Appl. No.: 17/985,785

(22) Filed: Nov. 11, 2022

(65) Prior Publication Data

US 2023/0074520 A1 Mar. 9, 2023

Related U.S. Application Data

(63) Continuation of application No. PCT/CN2022/091783, filed on May 9, 2022.

(30) Foreign Application Priority Data

May 31, 2021 (CN) .......................... 202110598151.1

(51) Int. Cl.
*G06T 7/11* (2017.01)
*G06T 7/33* (2017.01)
*G06T 11/00* (2006.01)

(52) U.S. Cl.
CPC .................. *G06T 7/11* (2017.01); *G06T 7/33* (2017.01); *G06T 11/008* (2013.01);
(Continued)

(58) Field of Classification Search
CPC . G06T 7/11; G06T 7/33; G06T 11/008; G06T 2200/04; G06T 2207/10101;
(Continued)

(56) References Cited

U.S. PATENT DOCUMENTS

2011/0134393 A1 6/2011 Iwase
2018/0061058 A1 3/2018 Xu et al.
(Continued)

FOREIGN PATENT DOCUMENTS

CN 111311592 A 6/2020
CN 112102472 * 12/2020 ............... G06T 3/06
(Continued)

OTHER PUBLICATIONS

Tencent Technology, ISR, PCT/CN2022/091783, Jul. 26, 2022, 2 pgs.
(Continued)

*Primary Examiner* — Jerome Grant, II
(74) *Attorney, Agent, or Firm* — Morgan, Lewis & Bockius LLP

(57) ABSTRACT

A computer device performs feature extraction on two-dimensional medical images included in a three-dimensional medical image, to obtain image features corresponding to the two-dimensional medical images. The three-dimensional medical image are obtained by continuously scanning a target tissue structure. The computer device determines offsets of the two-dimensional medical images in a target direction based on the image features. The computer device performs feature alignment on the image features based on the offsets, to obtain aligned image features. The computer
(Continued)

device performs three-dimensional segmentation on the three-dimensional medical image based on the aligned image features, to obtain three-dimensional layer distribution of the target tissue structure in the three-dimensional medical image.

20 Claims, 12 Drawing Sheets

(52) U.S. Cl.
CPC ............... *G06T 2200/04* (2013.01); *G06T 2207/10101* (2013.01); *G06T 2207/20084* (2013.01); *G06T 2207/30041* (2013.01)

(58) Field of Classification Search
CPC . G06T 2207/20084; G06T 2207/30041; G06T 7/174; G06T 2207/20081; G06T 7/0012; G06T 7/10; G06T 2207/20076; G06F 18/214; G06N 3/084; G06N 3/045
USPC .......................................................... 382/131
See application file for complete search history.

(56) References Cited

U.S. PATENT DOCUMENTS

2021/0103763 A1* 4/2021 Fan ........................... G06T 5/77
2022/0347490 A1* 11/2022 Novosad .............. A61N 5/1039

FOREIGN PATENT DOCUMENTS

CN         112200726 A        1/2021
CN         113822845 A        12/2021
JP         2015518383    *   7/2015   ........... G06T 7/0012

OTHER PUBLICATIONS

Tencent Technology, Extended European Search Report, EP Patent Application No. 22814976.1, Nov. 20, 2024, 13 pgs.

Ahmed A. Sleman et al., "A Novel 3D Segmentation Approach for Extracting Retinal Layers from Optical Coherence Tomography Images", The International Journal of Medical Physics Research and Practice, vol. 48, No. 4, Apr. 2021, 12 pgs.

Hong Liu et al., "Simultaneous Alignment and Surface Regression Using Hybrid 2D-3D Networks for 3D Coherent Layer Segmentation of Retina OCT Image", ARXIV.org, Mar. 2022, 12 pgs.

Tharindu De Silva et al., "Deep-Learning Based Multi-Modal Retinal Image Registration for the Longitudinal Analysis of Patients with Age-Related Macular Degeneration", Biomedical Optics Express, vol. 12, Issue 1, Jan. 2021, 18 pgs.

Tencent Technology, WO, PCT/CN2022/091783, Sep. 21, 2023, 4 pgs.

Tencent Technology, IPRP, PCT/CN2022/091783, Nov. 21, 2023, 5 pgs.

\* cited by examiner

METHOD AND APPARATUS FOR PERFORMING LAYER SEGMENTATION ON TISSUE STRUCTURE IN MEDICAL IMAGE, DEVICE, AND MEDIUM

CROSS-REFERENCE TO RELATED APPLICATIONS

This application is a continuation application of PCT Patent Application No. PCT/CN2022/091783, entitled "HIERARCHICAL SEGMENTATION METHODS, APPARATUS, APPARATUS AND MEDIA OF TISSUE STRUCTURE IN MEDICAL IMAGES" filed on May 9, 2022, which claims priority to Chinese Patent Application No. 202110598151.1, filed with the State Intellectual Property Office of the People's Republic of China on May 31, 2021, and entitled "METHOD AND APPARATUS FOR PERFORMING LAYER SEGMENTATION ON TISSUE STRUCTURE IN MEDICAL IMAGE, DEVICE, AND MEDIUM", all of which are incorporated herein by reference in their entirety.

FIELD OF THE TECHNOLOGY

Embodiments of this application relate to the field of artificial intelligence, and in particular, to a method and an apparatus for performing layer segmentation on a tissue structure in a medical image, a device, and a medium

BACKGROUND OF THE DISCLOSURE

Medical scanning is a technology that uses a scanning instrument to scan a tissue structure to obtain a three-dimensional image of the tissue structure. Common medical scanning technologies include computed tomography (CT), optical coherence tomography (OCT), and the like.

By observing a medical image obtained through medical scanning, medical staff may analyze whether an abnormality or a lesion exists in a tissue structure. For example, the medical staff can diagnose pathological changes of a retina layer based on an OCT image of eyes. In the related technology, when layer segmentation is performed on an OCT image by using a computer device, each two-dimensional OCT image is segmented as an independent individual to obtain a layer position of each two-dimensional OCT image.

However, due to the continuity of layer distribution of a tissue structure in a three-dimensional space, the accuracy of a segmentation result obtained by only two-dimensional layer segmentation is relatively poor, and the provided diagnostic information is limited, leading to the low utilization of current medical images.

SUMMARY

Embodiments of this application provide a method and an apparatus for performing layer segmentation on a tissue structure in a medical image, a device, and a computer readable storage medium, which can improve utilization of a medical image. The technical solutions are as follows.

In an aspect, the embodiments of this application provide a method for performing layer segmentation on a tissue structure in a medical image, performed by a computer device, the method including:

performing feature extraction on two-dimensional medical images included in a three-dimensional medical image, to obtain image features corresponding to the two-dimensional medical images, the three-dimensional medical image being obtained by continuously scanning a target tissue structure;

determining offsets of the two-dimensional medical images in a target direction based on the image features;

performing feature alignment on the image features based on the offsets, to obtain aligned image features; and performing three-dimensional segmentation on the three-dimensional medical image based on the aligned image features, to obtain three-dimensional layer distribution of the target tissue structure in the three-dimensional medical image.

In another aspect, the embodiments of this application provide a method for performing layer segmentation on a tissue structure in a medical image, performed by a computer device, the method including:

performing feature extraction on sample two-dimensional medical images included in a sample three-dimensional medical image by using a feature extraction network, to obtain sample image features corresponding to the sample two-dimensional medical images, the sample three-dimensional medical image being obtained by continuously scanning a sample tissue structure;

inputting the sample image features into an alignment network, to obtain sample offsets of the sample two-dimensional medical images in a target direction;

performing feature alignment on the sample image features based on the sample offsets, to obtain aligned sample image features;

inputting the aligned sample image features into a segmentation network, to obtain a sample three-dimensional segmentation result corresponding to the sample three-dimensional medical image, the sample three-dimensional segmentation result being used for representing a layer distribution condition of the sample tissue structure; and training the feature extraction network, the alignment network, and the segmentation network based on the sample offsets, the sample three-dimensional segmentation result, and a ground truth.

In another aspect, the embodiments of this application provide an apparatus for performing layer segmentation on a tissue structure in a medical image, applicable to a computer device, and the apparatus including:

a first extraction module, configured to perform feature extraction on two-dimensional medical images included in a three-dimensional medical image, to obtain image features corresponding to the two-dimensional medical images, the three-dimensional medical image being obtained by continuously scanning a target tissue structure;

an offset determining module, configured to determine offsets of the two-dimensional medical images in a target direction based on the image features;

a first alignment module, configured to perform feature alignment on the image features based on the offsets, to obtain aligned image features; and a first segmentation module, configured to perform three-dimensional segmentation on the three-dimensional medical image based on the aligned image features, to obtain three-dimensional layer distribution of the target tissue structure in the three-dimensional medical image.

In a possible implementation, the first extraction module is configured to:
  perform feature extraction on the two-dimensional medical images by using a feature extraction network, to obtain at least two layers of the image features of the two-dimensional medical images, the feature extraction network being a two-dimensional convolutional neural network, and image features of different layers being obtained by performing feature extraction by different two-dimensional convolutional layers in the feature extraction network; and the first alignment module is configured to:
  perform feature alignment on the image features of the layers based on the offsets, to obtain the aligned image features.

In a possible implementation, the first alignment module is further configured to:
  adjust the offsets based on feature sizes of the image features, to obtain adjusted offsets; and
  perform feature alignment on the image features based on the adjusted offsets, to obtain the aligned image features.

In a possible implementation, the offset determining module is configured to:
  input the image features of the layers into an alignment network, to obtain an offset vector outputted by the alignment network, the offset vector including the offsets of the two-dimensional medical images in the target direction, the alignment network being a three-dimensional convolutional neural network formed by three-dimensional convolutional layers, and the alignment network being in a skip-connection to the convolutional layers in the feature extraction network.

In a possible implementation, the first segmentation module is configured to:
  input the aligned image features of the layers into a segmentation network, to obtain layer distribution probabilities outputted by the segmentation network, the layer distribution probabilities being used for representing probabilities of positions of layers of the target tissue structure in the three-dimensional medical image, the segmentation network being a three-dimensional convolutional neural network formed by three-dimensional convolutional layers, and the segmentation network being in a skip-connection to the convolutional layers in the feature extraction network; and
  generate the three-dimensional layer distribution of the target tissue structure based on the layer distribution probabilities.

In a possible implementation, the first extraction module is configured to:
  perform feature extraction on the two-dimensional medical images layer by layer by using at least two two-dimensional convolutional layers included in the feature extraction network, to obtain a high-layer image feature outputted by a last two-dimensional convolutional layer and a lower-layer image feature outputted by another two-dimensional convolutional layer.

In a possible implementation, the three-dimensional medical image is obtained by segmenting a complete medical image; and
  the apparatus further includes:
  a splicing module, configured to splice three-dimensional layer distribution of the three-dimensional medical images based on positions of the three-dimensional images in the complete medical image, to obtain complete three-dimensional layer distribution of the complete medical image.

In a possible implementation, the three-dimensional medical image is an optical coherence tomography (OCT) image, the two-dimensional medical image is obtained by transverse scanning (B-scan), and the target direction is a longitudinal scanning (A-scan) direction.

In another aspect, the embodiments of this application provide an apparatus for performing layer segmentation on a tissue structure in a medical image, applicable to a computer device, and the apparatus including:
  a second extraction module, configured to perform feature extraction on sample two-dimensional medical images included in a sample three-dimensional medical image by using a feature extraction network, to obtain sample image features corresponding to the sample two-dimensional medical images, the sample three-dimensional medical image being obtained by continuously scanning a sample tissue structure;
  an offset prediction module, configured to input the sample image features into an alignment network, to obtain sample offsets of the sample two-dimensional medical images in a target direction;
  a second alignment module, configured to perform feature alignment on the sample image features based on the sample offsets, to obtain aligned sample image features;
  a second segmentation module, configured to input the aligned sample image features into a segmentation network, to obtain a sample three-dimensional segmentation result corresponding to the sample three-dimensional medical image, the sample three-dimensional segmentation result being used for representing a layer distribution condition of the sample tissue structure; and
  a training module, configured to train the feature extraction network, the alignment network, and the segmentation network based on the sample offsets, the sample three-dimensional segmentation result, and a ground truth.

In a possible implementation, the training module includes:
  a first loss determining unit, configured to determine an alignment loss of the alignment network based on the sample offsets and the ground truth;
  a second loss determining unit, configured to determine a first segmentation loss of the segmentation network based on the sample three-dimensional segmentation result and the ground truth; and
  a training unit, configured to train the feature extraction network, the alignment network, and the segmentation network based on the alignment loss and the first segmentation loss.

In a possible implementation, the first loss determining unit is configured to:
  perform image alignment on the sample two-dimensional medical images based on the sample offsets;
  determine a normalized cross-correlation loss based on aligned adjacent sample two-dimensional medical images;
  determine a first smooth loss based on a distance between same sample label points in the aligned adjacent sample two-dimensional medical images; and
  determine the normalized cross-correlation loss and the first smooth loss as the alignment loss.

In a possible implementation, the second loss determining unit is configured to:
  determine a cross-entropy loss based on a sample layer distribution probability indicated by the sample three-dimensional segmentation result, the sample layer distribution probability being used for representing a probability of a position of each layer of the sample tissue structure in the sample three-dimensional medical image;
  generate sample layer distribution based on the sample layer distribution probability; determine a first norm loss based on the sample layer distribution and labeled layer distribution indicated by the ground truth;
  determine a second smooth loss based on a position difference between adjacent points in the sample layer distribution; and
  determine the cross-entropy loss, the first norm loss, and the second smooth loss as the first segmentation loss.

In a possible implementation, the second loss determining unit is configured to:
  determining the position difference between the adjacent points in the sample layer distribution; and
  determine the second smooth loss by using a curved surface-approximate two-dimensional gradient as a constraint of the position difference.

In a possible implementation, the segmentation network includes a first network output head and a second network output head, the first network output head is configured to output the sample three-dimensional segmentation result, and the second network output head is configured to output layer labels of layers to which pixels belong in an image;
  the apparatus further includes:
  a third segmentation module, configured to input the aligned sample image features into the segmentation network, to obtain a sample pixel label result corresponding to the sample three-dimensional medical image; and the training module is further configured to:
  train the feature extraction network, the alignment network, and the segmentation network based on the sample offsets, the sample three-dimensional segmentation result, the sample pixel label result, and the ground truth.

In a possible implementation, the training module includes:
  a first loss determining unit, configured to determine an alignment loss of the alignment network based on the sample offsets and the ground truth;
  a second loss determining unit, configured to determine a first segmentation loss of the segmentation network based on the sample three-dimensional segmentation result and the ground truth;
  a third loss determining unit, configured to determine a second segmentation loss of the segmentation network based on the sample pixel label result and the ground truth; and
  a training unit, configured to train the feature extraction network, the alignment network, and the segmentation network based on the alignment loss, the first segmentation loss, and the second segmentation loss.

In another aspect, the embodiments of this application provide a computer device, including a processor and a memory, the memory storing at least one instruction, the at least one instruction being loaded and executed by the processor to implement the method described in the foregoing aspects.

In another aspect, the embodiments of this application provide a computer-readable storage medium, storing at least one instruction, and the at least one instruction being loaded and executed by a processor to implement the method according to the foregoing aspects.

In another aspect, the embodiments of this application provide a computer program product or a computer program, including computer instructions, the computer instructions being stored in a computer-readable storage medium. A processor of a computer device reads the computer instructions from the computer-readable storage medium, and executes the computer instructions, to cause the computer device to perform the method according to the foregoing aspects.

In the embodiments of this application, after feature extraction is performed on two-dimensional medical images in a three-dimensional medical image, offsets of the two-dimensional medical images caused by movement of a target tissue structure during continuous scanning are determined based on image features, and feature alignment is performed on the image features based on the offsets, so that feature segmentation is performed on the three-dimensional medical image based on aligned image features, to obtain layer distribution of the target tissue structure in the three-dimensional medical image. By using the solution provided in the embodiments of this application, layer recognition at a three-dimensional layer can be implemented, and three-dimensional layer distribution of a tissue structure is segmented from the three-dimensional medical image, to provide more effective information for subsequent diagnosis, and improve the utilization of the medical image. In addition, feature alignment is performed on the image features before three-dimensional segmentation, so that offsets between images caused by movement of the target tissue structure can be eliminated during scanning, to improve accuracy of layer distribution obtained through segmentation.

DESCRIPTION OF EMBODIMENTS

According to the method disclosed in the embodiments of this application, layer segmentation is performed on a tissue structure in a medical image by using a computer vision technology, to determine a three-dimensional layer structure of the tissue structure. For example, by using the solution provided in the embodiments of this application, a three-dimensional layer position of a retina layer may be obtained through segmentation based on an OCT image of an eyeball of a human eye.

Figure 1:
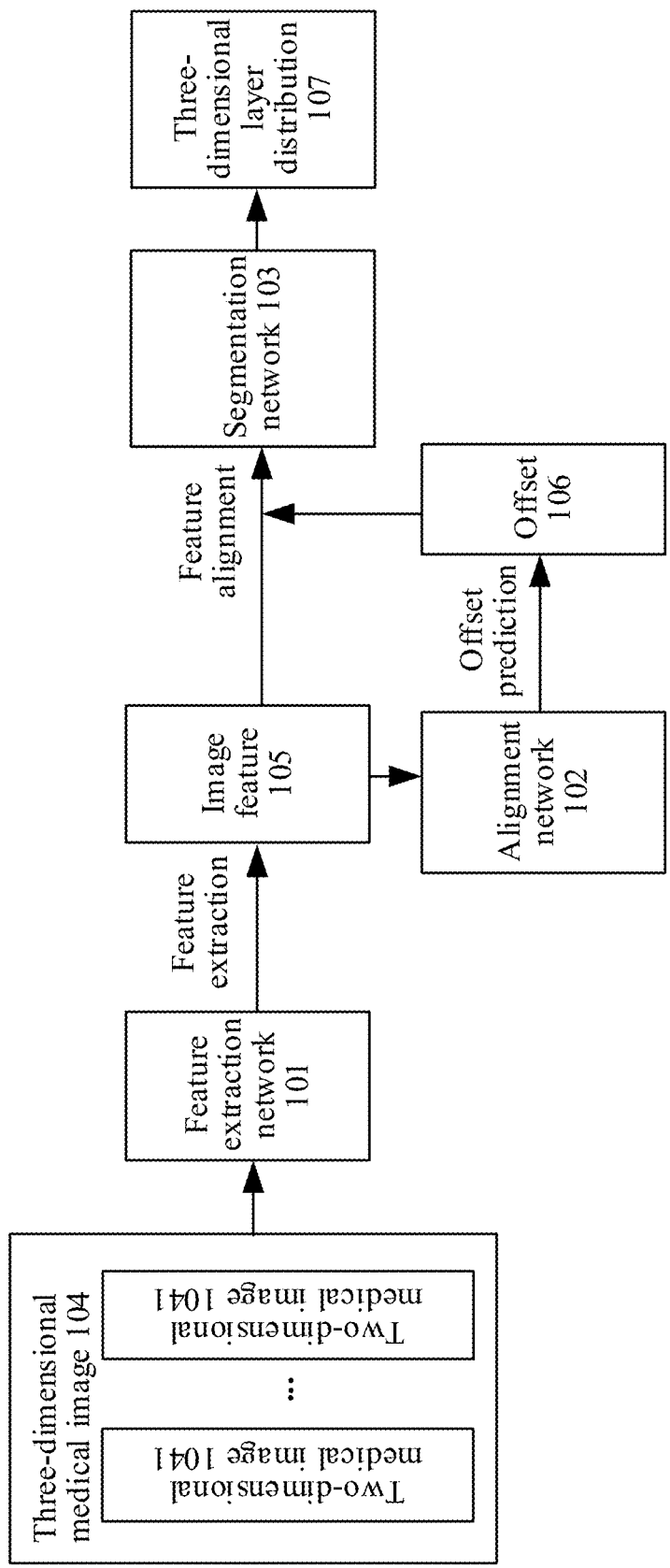
FIG. 1 is a structural diagram of a layer segmentation model according to an exemplary embodiment of this application.

In an implementation, a computer device performs layer segmentation on a tissue structure by using a layer segmentation model, the layer segmentation model being a 2D-3D mixture model. FIG. 1 is a structural diagram of a layer segmentation model according to an exemplary embodiment of this application. The layer segmentation model is formed by a feature extraction network 101 (a 2D network), an alignment network 102 (a 3D network), and a segmentation network 103 (a 3D network).

During layer segmentation, a three-dimensional medical image 104 (which is formed by two-dimensional medical images 1041 obtained through continuous scanning) is first input into the feature extraction network 101. The feature extraction network 101 performs feature extraction on the two-dimensional medical images 1041, to obtain image features 105. When a target tissue structure may be continuously scanned, the target tissue structure may move (e.g., due to movement of the human subject), correspondingly, a relative offset may occur between the scanned two-dimensional medical images 1041. Therefore, after the image features 105 are extracted by using the feature extraction network 101, offset prediction is performed on the two-dimensional medical images 1041 using the alignment network 102 based on the image features 105 rather than three-dimensional layer segmentation is directly performed based on the image features 105, to obtain offsets 106 of the two-dimensional medical images 1041, feature alignment is performed on the image features 105 based on the offsets 106, aligned image features 105 are input into the segmentation network 103, and the segmentation network 103 performs three-dimensional layer segmentation, to finally obtained three-dimensional layer distribution 107 of the target tissue structure in the three-dimensional medical image 104.

Compared with manual layer recognition, the layer segmentation model may be configured to implement three-dimensional layer recognition of a three-dimensional medical image, to obtain three-dimensional layer distribution of a tissue structure. This not only improves the efficiency of layer segmentation, but also can extract more effective information from the medical image and improve the utilization of the medical image. In addition, an offset between images is predicted before three-dimensional segmentation, so that feature alignment is performed on image features based on the offset, to eliminate an impact caused by movement of the tissue structure during scanning and improve accuracy of the three-dimensional layer distribution obtained through segmentation, thereby improving the accuracy of subsequent medical diagnosis based on the three-dimensional layer distribution.

The method for performing layer segmentation on a tissue structure in a medical image provided in the embodiments of this application is applicable to a layer segmentation task of a tissue structure. The tissue structure can be a human tissue structure such as an eyeball, a heart, or a blood vessel. In addition, the medical image may be a CT image, an OCT image, or the like, and types of the medical image and the tissue structure are not limited in the embodiments of this application.

In a possible application scenario, the method provided in the embodiments of this application may be implemented as all or a part of a medical image processing program. When using the medical image processing program, medical staff needs to input only a scanned three-dimensional medical image into the program, and the program may automatically perform layer segmentation on the three-dimensional medical image and output layer distribution of a tissue structure in the image. Subsequently, the medical staff may analyze whether an abnormality or a lesion exists in the tissue structure based on the layer distribution. Certainly, in addition to outputting the layer distribution of the tissue structure, the medical image processing program may further output an aligned three-dimensional medical image for the medical staff to manually recognize the layer distribution of the tissue structure based on the image.

In another possible application scenario, the output of the medical image processing program may be used as an input of a downstream system, and the downstream system performs further processing based on the layer distribution. For example, the layer distribution that is output by the medical image processing program may be used as an input into an artificial intelligence consulting system, and the artificial intelligence consulting system provides a reference consulting result based on the layer distribution and feeds back to a user.

Figure 2:
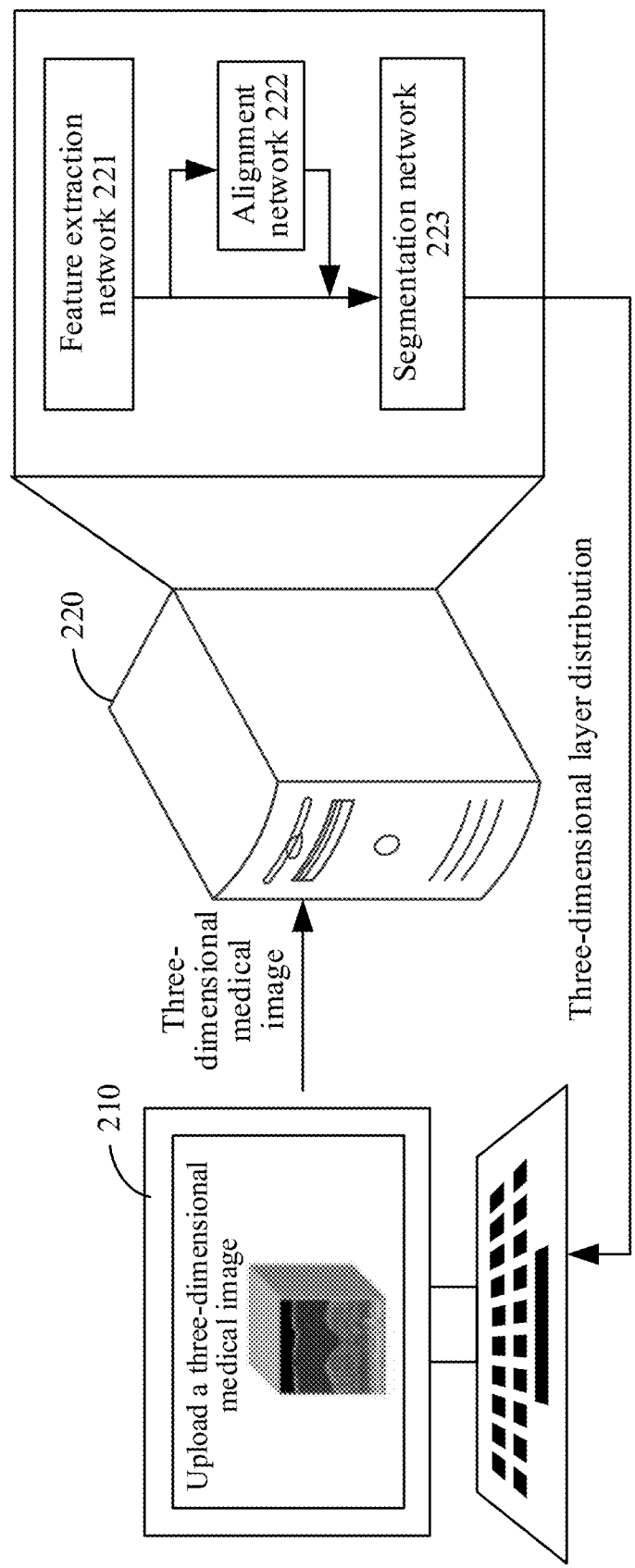
FIG. 2 is a schematic diagram of an implementation environment according to an exemplary embodiment of this application.

In addition to the application scenario, the method provided in the embodiments of this application is further applicable to another scenario in which layer segmentation needs to be performed on a tissue structure based on an image, and a specific application scenario is not limited in the embodiments of this application FIG. 2 is a schematic diagram of an implementation environment according to an exemplary embodiment of this application. The implementation environment includes a terminal 210 and a server 220. The terminal 210 and the server 220 perform data communication with each other through a communication network. The communication network may be a wired network or a wireless network, and the communication network may be at least one of a local area network, a metropolitan area network, or a wide area network.

The terminal 210 is an electronic device having a medical image layer segmentation requirement, and the electronic device may be a smartphone, a tablet computer, a personal computer, or the like. This is not limited in this embodiment.

A description is made by using an example in which the terminal 210 is a computer used by medical staff in FIG. 2.

In some embodiments, an application having a medical image layer segmentation function is installed on the terminal 210. When layer segmentation needs to be performed on a three-dimensional medical image obtained through scanning, a user inputs the three-dimensional medical image to be segmented into the application, to upload the three-dimensional medical image to the server 220, and the server 220 performs layer segmentation on the three-dimensional medical image and feeds back a segmentation result.

The server 220 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

In some embodiments, the server 220 is configured to provide a medical image layer segmentation service for the application installed on the terminal 210. In some embodiments, a layer segmentation model is disposed in the server 220, and the layer segmentation model is formed by a feature extraction network 221, an alignment network 222, and a segmentation network 223. During layer segmentation, the server 220 inputs a to-be-segmented three-dimensional medical image into the feature extraction network 221, the feature extraction network 221 performs feature extraction on two-dimensional medical images, further feature alignment is performed on extracted image features by using the alignment network 222, the segmentation network 223 performs three-dimensional segmentation on an aligned image feature, and finally obtained three-dimensional layer distribution is fed back to the terminal 210. After receiving the three-dimensional layer distribution, the terminal 210 parses and displays the three-dimensional layer distribution by using the application.

Certainly, in another possible implementation, the layer segmentation model may alternatively be deployed on a side of the terminal 210, and the terminal 210 performs three-dimensional layer segmentation in local without the server 220. This is not limited in this embodiment. For ease of description, the following embodiments are described by using an example in which the method for performing layer segmentation on a tissue structure in a medical image is performed by a computer device.

Figure 3:
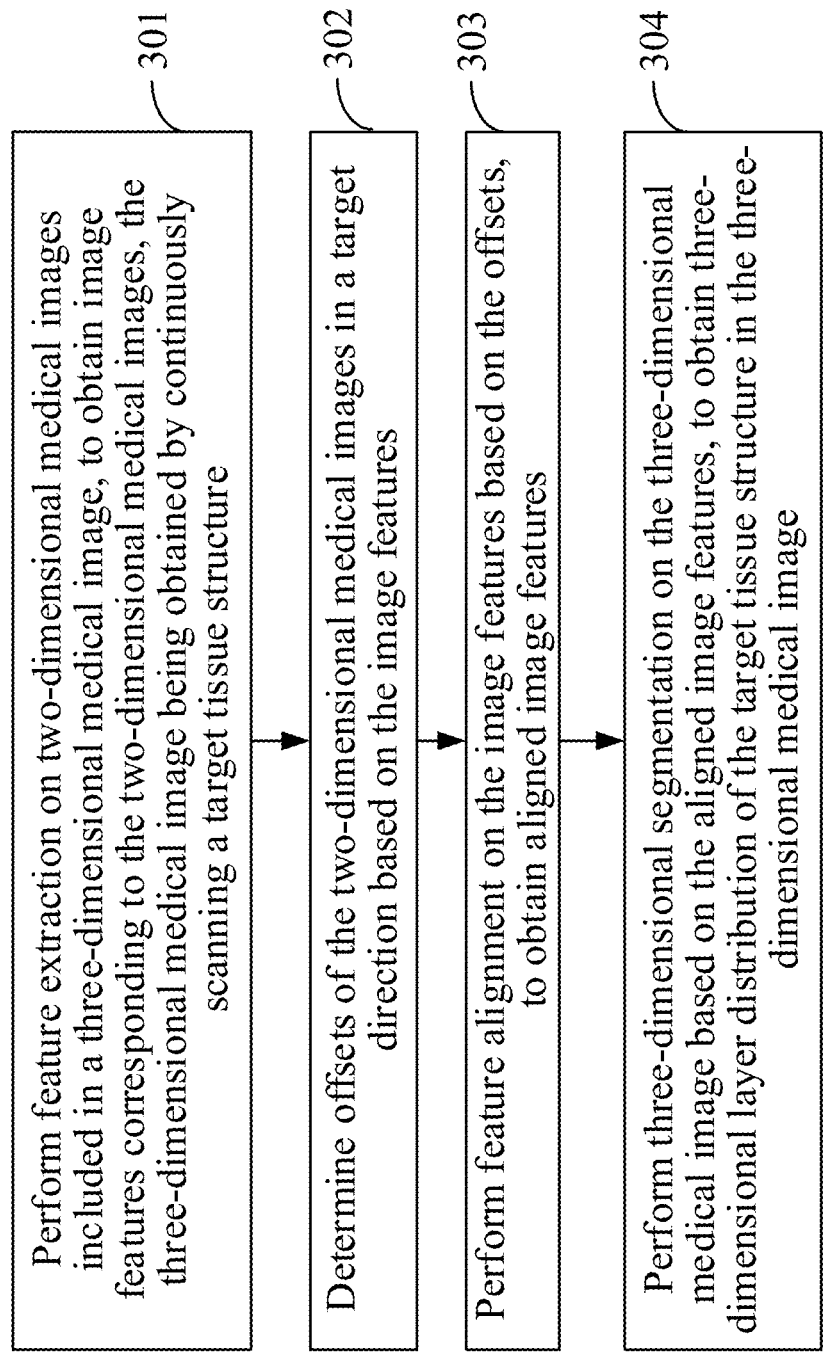
FIG. 3 is a flowchart of a method for performing layer segmentation on a tissue structure in a medical image according to an exemplary embodiment of this application.

FIG. 3 is a flowchart of a method for performing layer segmentation on a tissue structure in a medical image according to an exemplary embodiment of this application. In this embodiment, a description is made by using an example in which the method is applicable to a computer device. The method includes the following steps:

Step 301. Perform feature extraction on two-dimensional medical images included in a three-dimensional medical image, to obtain image features corresponding to the two-dimensional medical images. The three-dimensional medical image are obtained by continuously scanning a target tissue structure.

In this embodiment of this application, the three-dimensional medical image is an image set formed by a plurality of two-dimensional medical images obtained through continuous scanning, that is, different two-dimensional medical images are scanned images of different slices in the target tissue structure.

The target tissue structure is a multi-layer structure. The purpose of this embodiment of this application is to perform three-dimensional layer segmentation on the target tissue structure and determine positions of different layers in the three-dimensional medical image.

In some embodiments, the target tissue structure may be a human tissue structure such as an eyeball, a heart, or a blood vessel. The three-dimensional medical image may be a (three-dimensional) optical coherence tomography (OCT) image, and the two-dimensional medical image is an image obtained through B-scan (transverse scanning).

When $\Omega \subset R^3$ is given, a three-dimensional OCT image may be recoded as a real-valued function $V(x,y,z):\Omega \to R$, where the x-axis and the y-axis are the rows and columns of a B-scan image (that is, the two-dimensional medical image), and the z-axis is orthogonal to the B-scan image. V may be considered as a sorted set of all B-scans images in an OCT image: $V(b)=\{I_b\}$, $I_b:\Omega \to R$ being a $b^{th}$ B-scan image, $\Phi \subset R^2$, $b \in [1, N_B]$, and $N_B$ is the total number of B-scans images in the three-dimensional OCT image.

In the following embodiments, a description is made by using an example in which the three-dimensional medical image is an eye OCT image and layer segmentation needs to be performed on a retina layer in the eye OCT image, but this is not limited thereto.

In a possible implementation, the computer device respectively performs feature extraction on two-dimensional medical images in a three-dimensional medical image, to obtain image features corresponding to the two-dimensional medical images, the image feature being a feature map. An image feature corresponding to a single two-dimensional medical image is used for representing a two-dimensional feature of the two-dimensional medical image. Stacked image features corresponding to a plurality of two-dimensional medical images may be used for representing a three-dimensional feature of the three-dimensional medical image.

Step 302. Determine offsets of the two-dimensional medical images in a target direction based on the image features.

The two-dimensional medical images in the three-dimensional medical image are obtained through a plurality of times of scanning (that is, the two-dimensional medical image are obtained separately from different scans), and the target tissue structure may move during scanning. Therefore, misalignment may occur between adjacent two-dimensional medical images. For example, during eye scanning, an eyeball may move, causing misalignment of the retina layer in adjacent two-dimensional medical images.

When misalignment occurs between two-dimensional medical images, if three-dimensional segmentation is directly performed by using extracted image features, accuracy of a finally obtained three-dimensional segmentation result is affected (the dislocation occurs between continuous positions at a same layer). To improve the accuracy of subsequent three-dimensional segmentation, in this embodiment, the computer device needs to determine offsets of the two-dimensional medical images based on the extracted image features, the offsets being offsets of the two-dimensional medical images in a target direction, and the target direction being a main movement direction of the target tissue structure.

In a possible implementation, when the two-dimensional medical image is a B-scan image, the target direction is an A-scan (longitudinal scanning) direction, that is, a y-axis direction (a column direction) of the B-scan image. For example, when the two-dimensional medical images are B-scan images in an eye OCT image, the retina layer may be represented as $S=\{r_{b,a}\}$, $a \in [1, N_A]$, $N_A$ being the number of A-scans, and $r_{b,a}$ is a position of a retina surface in an $a^{th}$ A-scan in a $b^{th}$ B-scan image.

Step 303. Perform feature alignment on the image features based on the offsets, to obtain aligned image features.

Further, the computer device performs feature alignment on the extracted image features in the target direction based on the determined offsets, to correct image feature dislocation caused by movement of the target tissue structure during scanning, so as to obtain aligned image features.

In a possible implementation, the computer device performs feature alignment on the image features in the A-scan direction based on the offsets.

Step 304. Perform three-dimensional segmentation on the three-dimensional medical image based on the aligned image features, to obtain three-dimensional layer distribution of the target tissue structure in the three-dimensional medical image.

Further, the computer device performs three-dimensional segmentation based on the aligned image feature, to obtain three-dimensional layer distribution of the target tissue structure in the three-dimensional medical image. In a possible implementation, the computer device performs three-dimensional segmentation based on the image features, to obtain coordinates of layers of the target tissue structure in the two-dimensional medical images, and further obtains three-dimensional layer distribution of the target tissue structure in the three-dimensional medical image based on the coordinates in the two-dimensional medical images (for example, a three-dimensional smooth surface of a specific layer in the target tissue structure).

In a possible application scenario, the computer device performs feature extraction on B-scan images in an eye OCT image, determines offsets of the B-scan images based on image features, and aligns the image features based on the offsets. After completing alignment, the computer device performs three-dimensional segmentation based on the image features, to obtain two-dimensional layer distribution of a retina layer in the B-scan images, and then splices the two-dimensional layer distribution in the B-scan images, to obtain three-dimensional layer distribution of the retina layer.

Based on the foregoing, in this embodiment of this application, after feature extraction is performed on two-dimensional medical images in a three-dimensional medical image, offsets of the two-dimensional medical images (e.g., that are caused by movement of a target tissue structure during continuous scanning) are first determined based on image features, and feature alignment is performed on the image features based on the offsets, so that feature segmentation is performed on the three-dimensional medical image based on aligned image features, to obtain layer distribution of the target tissue structure in the three-dimensional medical image. By using the solution provided in this embodiment of this application, layer recognition at a three-dimensional layer can be implemented, and three-dimensional layer distribution of a tissue structure is segmented from the three-dimensional medical image, to provide more effective information for subsequent diagnosis, and improve the utilization of the medical image. In addition, feature alignment is performed on the image features before three-dimensional segmentation, so that offsets between images caused by movement of the target tissue structure can be eliminated during scanning, to improve accuracy of layer distribution obtained through segmentation.

A complete medical image has a relatively large size, and a calculation amount is excessively large when layer segmentation is directly performed on the complete medical image. Therefore, before layer segmentation, the computer device usually segments the complete medical image into a plurality of three-dimensional medical images with a relatively small size and respectively performs layer segmentation on the plurality of three-dimensional medical images with a relatively small size obtained through segmentation. Correspondingly, after performing layer segmentation on the three-dimensional medical images to obtain three-dimensional layer distribution, the computer device needs to further splice three-dimensional layer distribution corresponding to the three-dimensional medical images based on positions of the three-dimensional medical images in the complete medical image, to obtain complete three-dimensional layer distribution corresponding to the complete medical image.

In addition, before segmentation, the computer device may further perform another pre-processing on the complete medical image, for example, leveling the retina layer in the OCT image. This is not limited in this embodiment.

In some embodiments, the feature extraction process may be performed by the feature extraction network. The offset determining process may be performed by the alignment network, and the three-dimensional segmentation process may be performed by the segmentation network. Processing processes of the networks are described below through exemplary embodiments.

Figure 4:
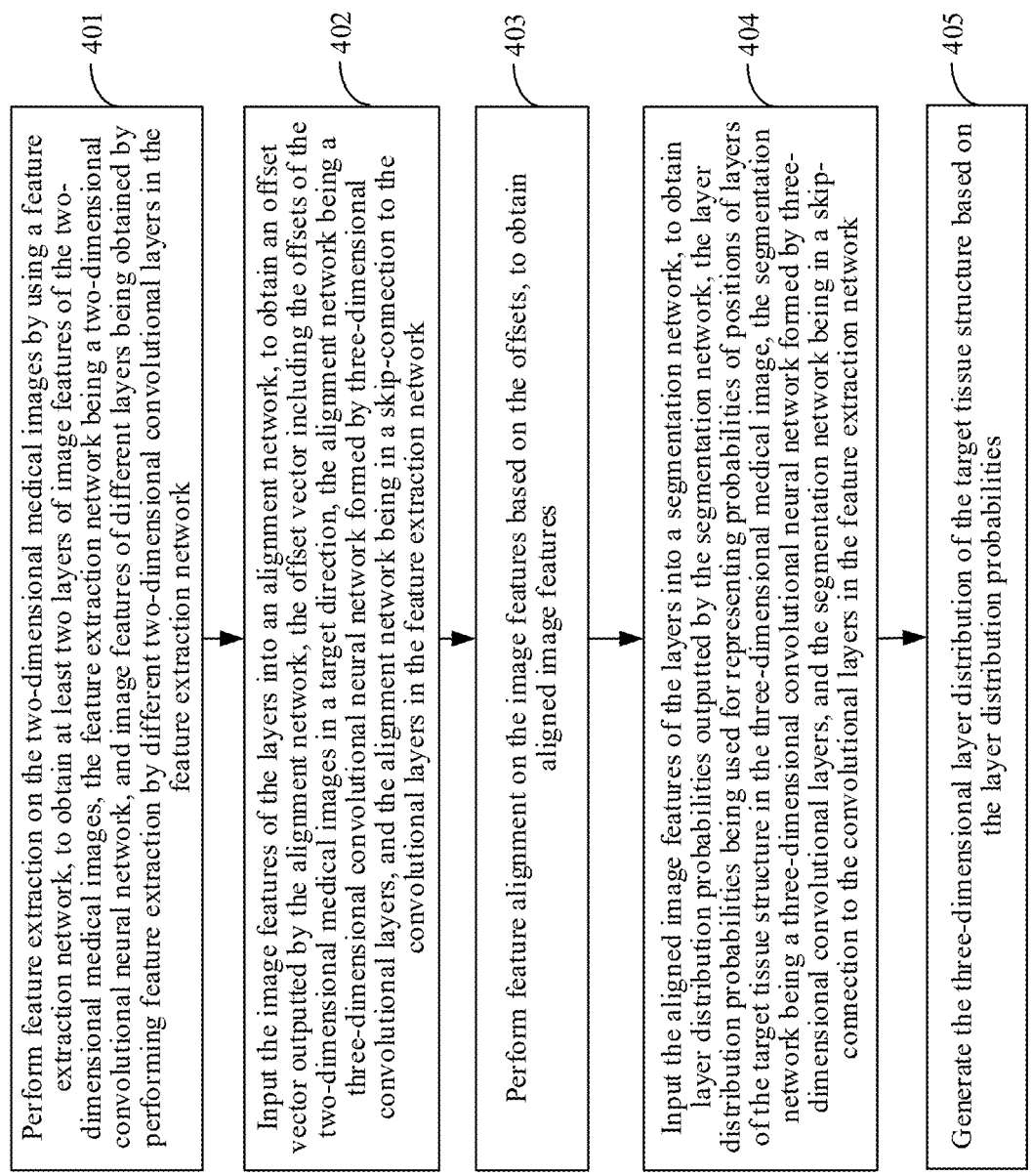
FIG. 4 is a flowchart of a method for performing layer segmentation on a tissue structure in a medical image according to another exemplary embodiment of this application.

FIG. 4 is a flowchart of a method for performing layer segmentation on a tissue structure in a medical image according to another exemplary embodiment of this application. In this embodiment, a description is made by using an example in which the method is applicable to a computer device. The method includes the following steps:

Step 401. Perform feature extraction on the two-dimensional medical images by using a feature extraction network, to obtain at least two layers of the image features of the two-dimensional medical images. The feature extraction network is a two-dimensional convolutional neural network, and image features of different layers are obtained by performing feature extraction using different two-dimensional convolutional layers in the feature extraction network.

In this embodiment, the computer device performs feature extraction on the two-dimensional medical images by using a pre-trained feature extraction network. The feature extraction network is equivalent to an encoder and is configured to perform downsampling encoding on the two-dimensional medical images. The feature extraction network is a two-dimensional convolutional neural network formed by at least two two-dimensional convolutional layers, that is, feature extraction is performed on the two-dimensional medical images, layer by layer, by using the at least two two-dimensional convolutional layers (processing such as convolution, pooling, or activation is performed by using two-dimensional convolution kernels), from a low-layer image feature to a high-layer image feature are extracted regularly, and with the deepening of feature extraction, the extracted image features are more abstract (that is, the high-layer image feature is more abstract than the low-layer image feature).

In some embodiments, the feature extraction network may be obtained by improving an existing feature extraction network or may be obtained through re-design. A specific network structure of the feature extraction network is not limited in this embodiment of this application. In addition, the number of channels in convolutional layers in the feature extraction network may be reduced, to reduce the number of parameters of the network.

In a possible implementation, the computer device may perform feature extraction on the two-dimensional medical images layer by layer by using at least two two-dimensional convolutional layers included in the feature extraction network, to obtain a high-layer image feature outputted by a last two-dimensional convolutional layer and a lower-layer image feature outputted by another two-dimensional convolutional layer.

The high-layer image feature finally outputted by the feature extraction network layer is too abstract, which is not conducive to subsequent feature decoding based on the high-layer image feature. Therefore, in this embodiment of this application, the computer device needs to obtain image features extracted by using the two-dimensional convolutional layers. That is, in addition to obtaining the high-layer image feature outputted by the last two-dimensional convolutional layer, the computer device further needs to obtain the low-layer image feature outputted by another two-dimensional convolutional layer.

Figure 5:
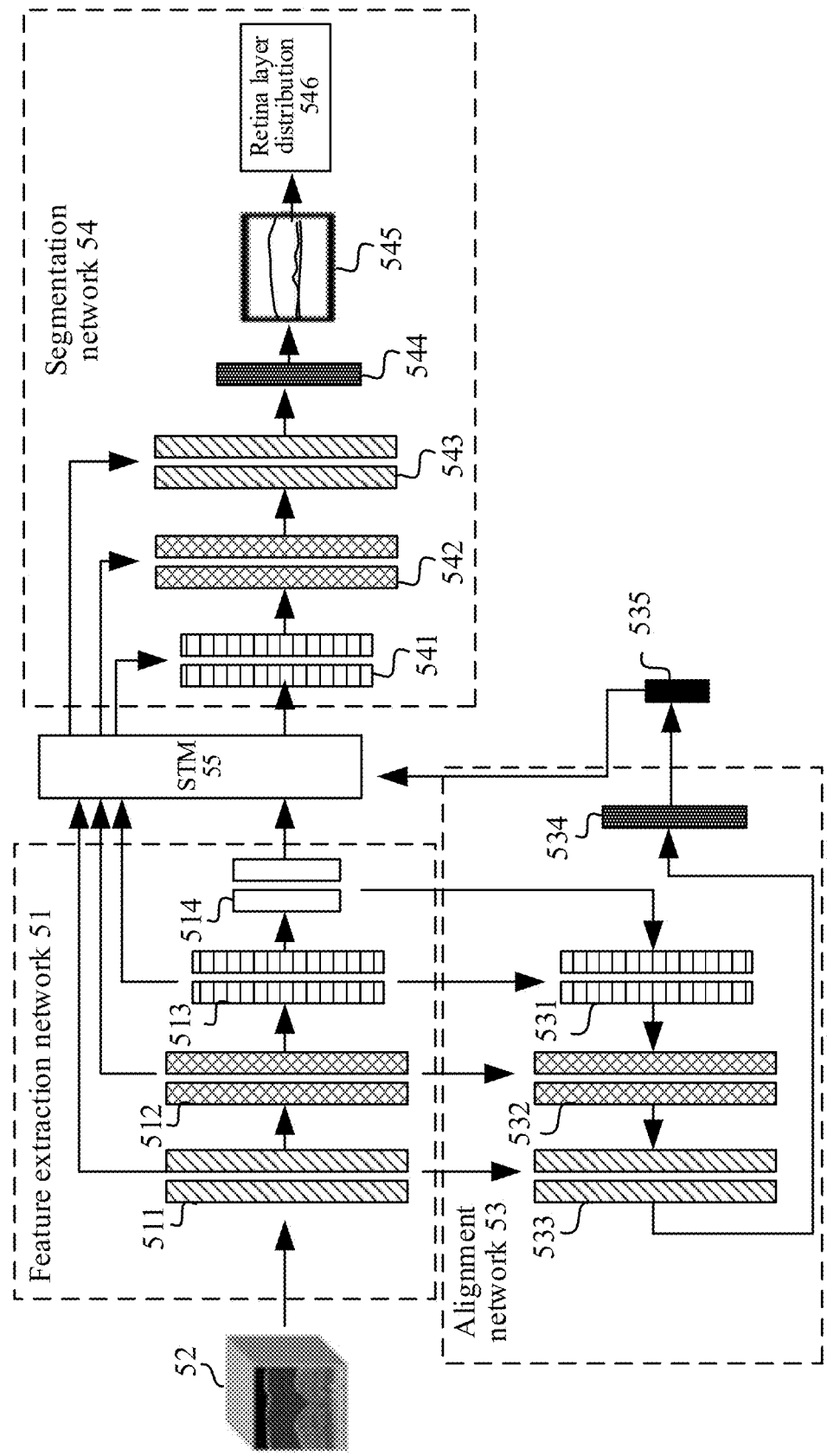
FIG. 5 is a schematic diagram of an implementation of a layer segmentation process according to an exemplary embodiment of this application.

For example, as shown in FIG. 5, a feature extraction network 51 is provided with four two-dimensional convolutional layers, which are respectively a first feature extraction layer 511, a second feature extraction layer 512, a third feature extraction layer 513, and a fourth feature extraction layer 514. After an eye OCT image 52 is input into the feature extraction network 51, feature extraction is performed on B-scan images layer by layer. Correspondingly, the computer device obtains image features outputted by the two-dimensional convolutional layers, which are respectively a first image feature outputted by the first feature extraction layer 511, a second image feature outputted by the second feature extraction layer 512, a third image feature outputted by the third feature extraction layer 513, and a fourth image feature outputted by the fourth feature extraction layer 514.

Step 402. Input the image features of the layers into an alignment network, to obtain an offset vector outputted by the alignment network, the offset vector including the offsets of the two-dimensional medical images in a target direction, the alignment network being a three-dimensional convolutional neural network formed by three-dimensional convolutional layers, and the alignment network being in a skip-connection to the convolutional layers in the feature extraction network.

After feature extraction is completed, to further determine the misalignment between continuous two-dimensional medical images in the three-dimensional medical image, the computer device inputs the extracted image features of the layers into the pre-trained alignment network, and the alignment network outputs an offset vector indicating an offset of each two-dimensional medical image in the target direction.

In some embodiments, the offset vector is a one-dimensional vector, and a quantity of pieces of data in the one-dimensional vector is consistent with a quantity of two-dimensional medical images in the three-dimensional medical image, that is, each piece of data in the offset vector represents an offset of a corresponding two-dimensional medical image in the target direction.

Because image features of the continuous two-dimensional medical images are continuous in space, the alignment network performs three-dimensional convolution processing on the image features by using a three-dimensional convolutional layer, which is different from the feature extraction network using the two-dimensional convolutional layer, to improve the accuracy of the determined offset.

The alignment network is equivalent to a decoder and is configured to perform feature decoding on the image features. In some embodiments, the alignment network is formed by at least two three-dimensional convolutional layers (processing such as convolution, pooling, or activation is performed on the image features by using three-dimensional convolution kernels), and feature decoding is performed on the image features layer by layer by using the at least two three-dimensional convolutional layers.

In addition, to avoid inaccurate offset prediction caused by performing alignment on only high-layer image features, in this embodiment, the alignment network is in a skip-connection to the convolutional layers in the feature extraction network, that is, low-layer image features extracted by the two-dimensional convolutional layers in the feature extraction network are transmitted to the three-dimensional convolutional layers in the alignment network, so that more low-layer image semantic information is fused during feature decoding, to improve quality of feature decoding.

For example, as shown in FIG. 5, an alignment network 53 is provided three three-dimensional convolutional layers, which are respectively a first alignment layer 531, a second alignment layer 532, and a third alignment layer 533, and a first output layer 534. The first alignment layer 531 is in a skip-connection to the third feature extraction layer 513 (the third image feature is directly transmitted to the first alignment layer 531), the second alignment layer 532 is in a skip-connection to the second feature extraction layer 512 (the second image feature is directly transmitted to the second alignment layer 532), and the third alignment layer 533 is in a skip-connection to the first feature extraction layer 511 (the first image feature is directly transmitted to the third alignment layer 533). After a series of feature decoding, the computer device performs fully-connected processing on the image features by using the first output layer 534, to obtain an offset vector 535 corresponding to the three-dimensional medical image.

Step 403. Perform feature alignment on the image features of the layers based on the offsets, to obtain aligned image features.

To avoid relatively low accuracy of three-dimensional segmentation caused by performing three-dimensional segmentation on only high-layer image features, in this embodiment, the image features of the layers extracted by the feature extraction network are all used for three-dimensional segmentation. Therefore, the computer device needs to perform feature alignment on the image features of the layers by using the determined offsets, that is, perform feature alignment on the high-layer image feature and the low-layer image feature.

In a possible implementation, a spatial transformer module (STM) is disposed in the layer segmentation model. The STM is configured to generate a corresponding space transformation parameter based on an inputted image or image feature (that is, a feature map), and then perform global space transformation on the image or the feature map according to the space transformation parameter. In this embodiment, after the computer device inputs the image features and the offset vector into the STM, the STM performs feature alignment on the image features based on the offsets in the offset vector, to eliminate the dislocation between the image features.

The offset determined by the alignment network is for an original two-dimensional medical image, and a downsampling process exists in the feature extraction process (that is, a feature size of the image feature is different from a size of the two-dimensional medical image). Therefore, during feature alignment, the computer device needs to adjust the offsets, to adapt to the feature sizes of the image features. In some embodiments, this step may include the following steps.

1. Adjust the offsets based on feature sizes of the image features, to obtain adjusted offsets.

In a possible implementation, for the image features of the layers, the computer device determines a scaling ratio of the offsets based on feature sizes of the image features and image sizes of the two-dimensional medical images, so as to adjust the offsets based on the scaling ratio.

In an exemplary example, when an image size of a two-dimensional medical image is 32*32, and a corresponding offset is d, an offset corresponding to an image feature of 16*16 (that is, a size of a feature map is 16*16) is d/2; and an offset corresponding to an image feature of 8*8 is d/4.

2. Perform feature alignment on the image features based on the adjusted offsets, to obtain the aligned image features.

Further, the computer device performs feature alignment on the image features in the target direction based on the offsets (adjusted) corresponding to the image features of the layers, to obtain the aligned image features, so as to eliminate the dislocation between the image features.

For example, as shown in FIG. 5, the computer device performs, by using an STM 55, feature alignment on the image features of the layers extracted by the feature extraction network 51.

Step 404. Input the aligned image features of the layers into a segmentation network, to obtain layer distribution probabilities outputted by the segmentation network, the layer distribution probabilities being used for representing probabilities of positions of layers in the target tissue structure in the three-dimensional medical image, the segmentation network being a three-dimensional convolutional neural network formed by three-dimensional convolutional layers, and the segmentation network being in a skip-connection to the convolutional layers in the feature extraction network.

Because the positions of the target tissue structure in the two-dimensional medical images has continuity (for example, positions of the retina layer in the two-dimensional medical images form a three-dimensional smooth curved surface), if two-dimensional segmentation is performed based on image features, continuity information of the target tissue structure between the two-dimensional medical images is lost, affecting the accuracy of layer segmentation To improve the accuracy of layer segmentation, in this embodiment of this application, the computer device performs three-dimensional segmentation based on the image features of the layers, that is, in the segmentation process, the layer continuity of the target tissue structure in different two-dimensional medical images is considered, to improve the accuracy of the three-dimensional layer distribution obtained through segmentation.

The segmentation network is equivalent to a decoder and is configured to perform feature decoding on the image features, to obtain a three-dimensional segmentation result. In some embodiments, the segmentation network is formed by at least two three-dimensional convolutional layers (processing such as convolution, pooling, or activation is performed on the image features by using three-dimensional convolution kernels), and feature decoding is performed on the image features layer by layer by using the at least two three-dimensional convolutional layers.

In addition, to avoid an inaccurate segmentation result caused by performing segmentation on only high-layer image features, in this embodiment, the segmentation network is in a skip-connection to the convolutional layers in the feature extraction network. That is, after feature alignment is performed on low-layer image features extracted by the two-dimensional convolutional layers in the feature extraction network, the aligned low-layer image features are transmitted to the three-dimensional convolutional layers in the segmentation network, so that more low-layer image semantic information is fused during feature decoding, to improve quality of feature decoding.

In some embodiments, the segmentation network further includes an output layer. The output layer may be a fully connected layer. After processing the image features, the three-dimensional convolutional layers output processing results to the output layer, to obtain layer distribution probabilities.

For example, when the two-dimensional medical image is a B-scan image, the layer distribution probability may be represented as $q_{b,a}(r|V; \theta)$. V represents a sorted set (a three-dimensional medical image) of the two-dimensional medical images, $\theta$ represents a network parameter of the segmentation network, b represents a $b^{th}$ two-dimensional medical image, a represents an $a^{th}$ A-scan column in the two-dimensional medical image, and r represents a pixel in an $r^{th}$ row in the A-scan column. A higher probability value of the layer distribution probability indicates a higher probability that the pixel in the $r^{th}$ row in the A-scan column in a target layer.

For example, as shown in FIG. 5, a segmentation network 54 is provided three three-dimensional convolutional layers, which are respectively a first segmentation layer 541, a second segmentation layer 542, and a third segmentation layer 543, and a second output layer 544. The first segmentation layer 541 is in a skip-connection to the third feature extraction layer 513 (the third image feature is directly transmitted to the first segmentation layer 541 after feature alignment), the second segmentation layer 542 is in a skip-connection to the second feature extraction layer 512 (the second image feature is directly transmitted to the second segmentation layer 542 after feature alignment), and the third segmentation layer 543 is in a skip-connection to the first feature extraction layer 511 (the first image feature is directly transmitted to the third segmentation layer 543 after feature alignment). After a series of feature decoding, the computer device performs fully-connected processing on the image features by using the second output layer 544, to obtain layer distribution probabilities 545.

Step 405. Generate the three-dimensional layer distribution of the target tissue structure based on the layer distribution probabilities.

In a possible implementation, the computer device obtains the three-dimensional layer distribution of the target tissue structure based on the layer distribution probabilities by using soft-argmax (combining a softmax function to achieve the goal of argmax). With reference to the example in the step, the three-dimensional layer distribution may be represented as $$\hat{r}_{b,a} = \sum_{r=1}^{R} r q_{b,a}(r | V, \theta),$$

R being a height of the A-scan column (that is, a quantity of pixels in the A-scan column).

For example, as shown in FIG. 5, the computer device finally generates retina layer distribution 546 corresponding to the eye OCT image 52 based on the layer distribution probability 545.

In this embodiment, the computer device performs three-dimensional layer segmentation by using the 2D-3D mixture model (that is, the layer segmentation model formed by the 2D feature extraction network, the 3D alignment network, and the 3D segmentation network) and fuses the continuity information of the target tissue structure in the two-dimensional medical images into the layer segmentation process, to help improve the accuracy of three-dimensional layer segmentation. In addition, before three-dimensional layer segmentation, feature alignment is performed on the image features, to eliminate an impact on the accuracy of layer segmentation caused by the dislocation of the image feature, so as to further improve the accuracy of three-dimensional segmentation.

An application process of the layer segmentation model is described in the foregoing embodiments, and a model training process is described below by using exemplary embodiments.

Figure 6:
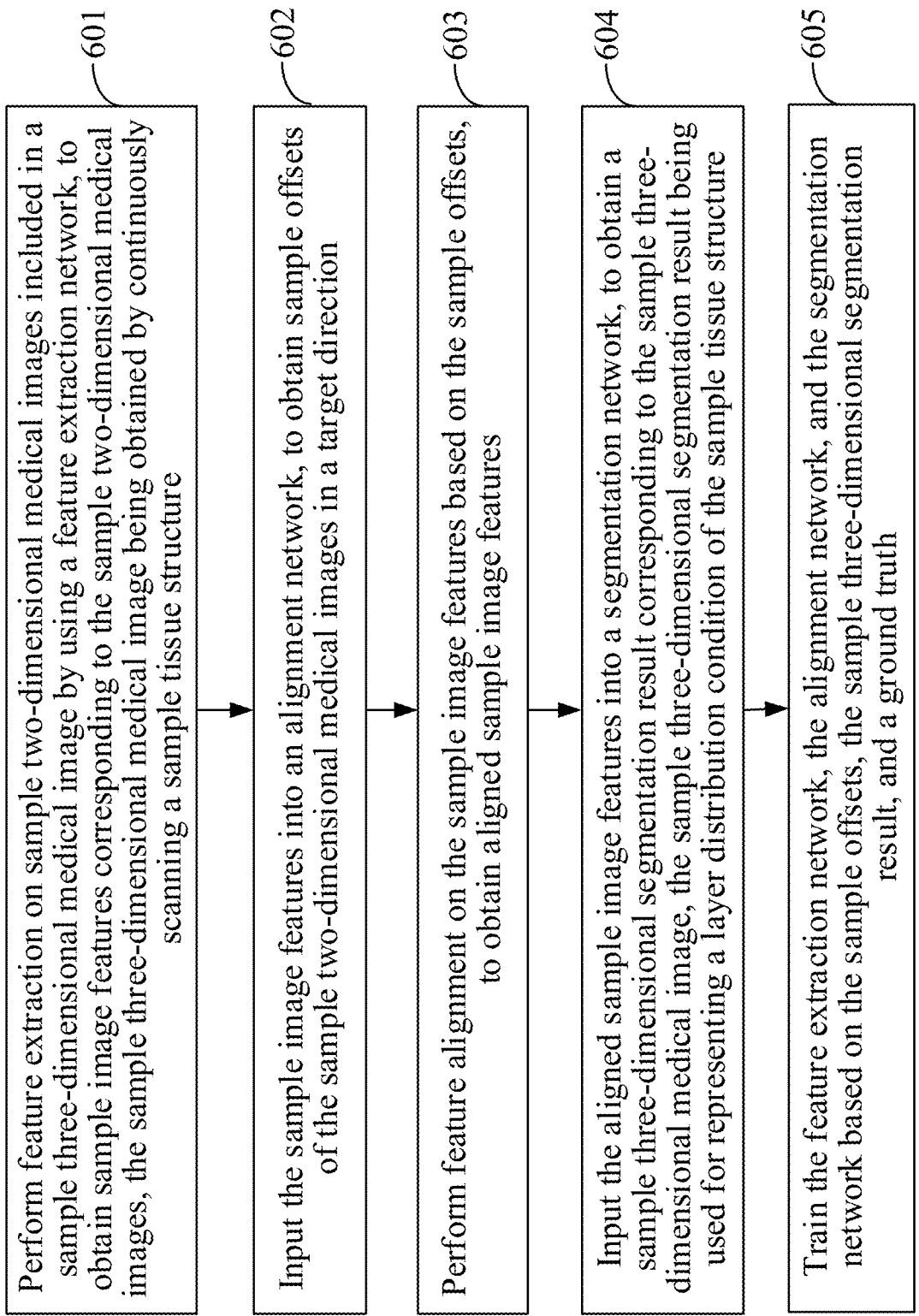
FIG. 6 is a flowchart of a method for performing layer segmentation on a tissue structure in a medical image according to another exemplary embodiment of this application.

FIG. 6 is a flowchart of a method for performing layer segmentation on a tissue structure in a medical image according to another exemplary embodiment of this application. In this embodiment, a description is made by using an example in which the method is applied to a computer device. The method includes the following steps:

Step 601. Perform feature extraction on sample two-dimensional medical images included in a sample three-dimensional medical image by using a feature extraction network, to obtain sample image features corresponding to the sample two-dimensional medical images. The sample three-dimensional medical image are obtained by continuously scanning a sample tissue structure.

In some embodiments, the sample three-dimensional medical image is obtained from a training data set. The training data set may be a public data set or a self-defined data set as required, and sample three-dimensional medical images correspond to ground truths. In this embodiment, the ground truth is used for indicating a layer position of the sample three-dimensional medical image in the sample tissue structure.

For example, the training data set is an SD-OCT. The training data set includes 256 eye OCT images of normal people and 115 eye OCT images of age-related macular patients. The OCT image is formed by a plurality of B-scan images obtained through continuous scanning, and the OCT image corresponds to manual labels of three retina layers, which are respectively internal of an internal limiting membrane (ILM), internal of an induced retinal pigment epithelium (IRPE) drusen complex, and an outer Bruch's membrane (OBM).

For a network structure of the feature extraction network and a process in which the feature extraction network performs feature extraction, reference may be made to the application embodiments. Details are not described in this embodiment again.

Step 602. Input the sample image features into an alignment network, to obtain sample offsets of the sample two-dimensional medical images in a target direction.

In a possible implementation, the computer device inputs the sample image features into an alignment network, to obtain a sample offset vector, the sample offset vector including the sample offsets of the sample two-dimensional medical images in a target direction.

In some embodiments, the alignment network is in a skip-connection to convolutional layers in the feature extraction network layer, and a sample image feature outputted by an intermediate convolutional layer in the feature extraction network layer may be transmitted to an intermediate convolutional layer in the alignment network, to fuse more low-layer image semantic information, thereby improving the offset prediction accuracy.

For a network structure of the alignment network and a process in which the alignment network performs offset prediction, reference may be made to the application embodiments. Details are not described in this embodiment again.

Step 603. Perform feature alignment on the sample image features based on the sample offsets, to obtain aligned sample image features.

In a possible implementation, the computer device respectively performs, based on the sample offsets, feature alignment on the sample image features outputted by the convolutional layers in the feature extraction network. During feature alignment, the computer device needs to adjust the sample offsets based on feature sizes of the sample image features, so as to perform feature alignment by using adjusted sample offsets. For a feature alignment process, reference may be made to the application embodiments. Details are not described in this embodiment again.

Step 604. Input the aligned sample image features into a segmentation network, to obtain a sample three-dimensional segmentation result corresponding to the sample three-dimensional medical image, the sample three-dimensional segmentation result being used for representing a layer distribution condition of the sample tissue structure.

In some embodiments, the segmentation network is in a skip-connection to the convolutional layers in the feature extraction network layer, and after feature alignment is performed on sample image features outputted by the intermediate convolutional layer in the feature extraction network, aligned sample image features may be transmitted to an intermediate convolutional layer in the segmentation network, to fuse more low-layer image semantic information during layer segmentation, thereby improving the layer segmentation accuracy.

For a network structure of the segmentation network and a process in which the segmentation network performs three-dimensional layer segmentation, reference may be made to the application embodiments. Details are not described in this embodiment again.

In some embodiments, the sample three-dimensional segmentation result is represented as a sample layer distribution probability, and the sample layer distribution probability is used for representing a probability of a position of each layer in the sample tissue structure in the sample three-dimensional medical image.

For example, when the sample two-dimensional medical image is a B-scan image, the sample layer distribution probability may be represented as $q_{b,a}(r|V; \theta)$, V representing a sorted set (a sample three-dimensional medical image) of the sample two-dimensional medical images, $\theta$ representing a network parameter of the segmentation network, b representing a $b^{th}$ sample two-dimensional medical image, a representing an $a^{th}$ A-scan column in the sample two-dimensional medical image, and r representing a pixel in an $r^{th}$ row in the A-scan column. A higher probability value of the sample layer distribution probability indicates a higher probability that the pixel in the $r^{th}$ row in the A-scan column in a target layer.

Step 605. Train the feature extraction network, the alignment network, and the segmentation network based on the sample offsets, the sample three-dimensional segmentation result, and a ground truth.

After obtaining the sample offsets and the sample three-dimensional segmentation result through the steps, the computer device determines a total loss of the layer segmentation model by using the ground truth corresponding to the sample three-dimensional medical image as a supervision and trains the feature extraction network, the alignment network, and the segmentation network by using a back propagation algorithm (that is, adjusts network parameters) until a training completion condition is met.

In a possible implementation, the training process is completed in a Py Torch (1.4.0) neural network architecture. In addition, during training, an Adam algorithm is used as an optimizer during network training, there are 120 rounds of training, an initial learning rate of training is 1e-3, and during training, if a loss function is not reduced after 10 rounds, the learning rate is reduced by half.

Based on the foregoing, in this embodiment of this application, after feature extraction is performed on two-dimensional medical images in a three-dimensional medical image, offsets of the two-dimensional medical images caused by movement of a target tissue structure during continuous scanning are first determined based on image features, and feature alignment is performed on the image features based on the offsets, so that feature segmentation is performed on the three-dimensional medical image based on aligned image features, to obtain layer distribution of the target tissue structure in the three-dimensional medical image. By using the solution provided in this embodiment of this application, layer recognition at a three-dimensional layer can be implemented, and three-dimensional layer distribution of a tissue structure is segmented from the three-dimensional medical image, to provide more effective information for subsequent diagnosis, and improve the utilization of the medical image. In addition, feature alignment is performed on the image features before three-dimensional segmentation, so that offsets between images caused by movement of the target tissue structure can be eliminated during scanning, to improve accuracy of layer distribution obtained through segmentation.

Figure 7:
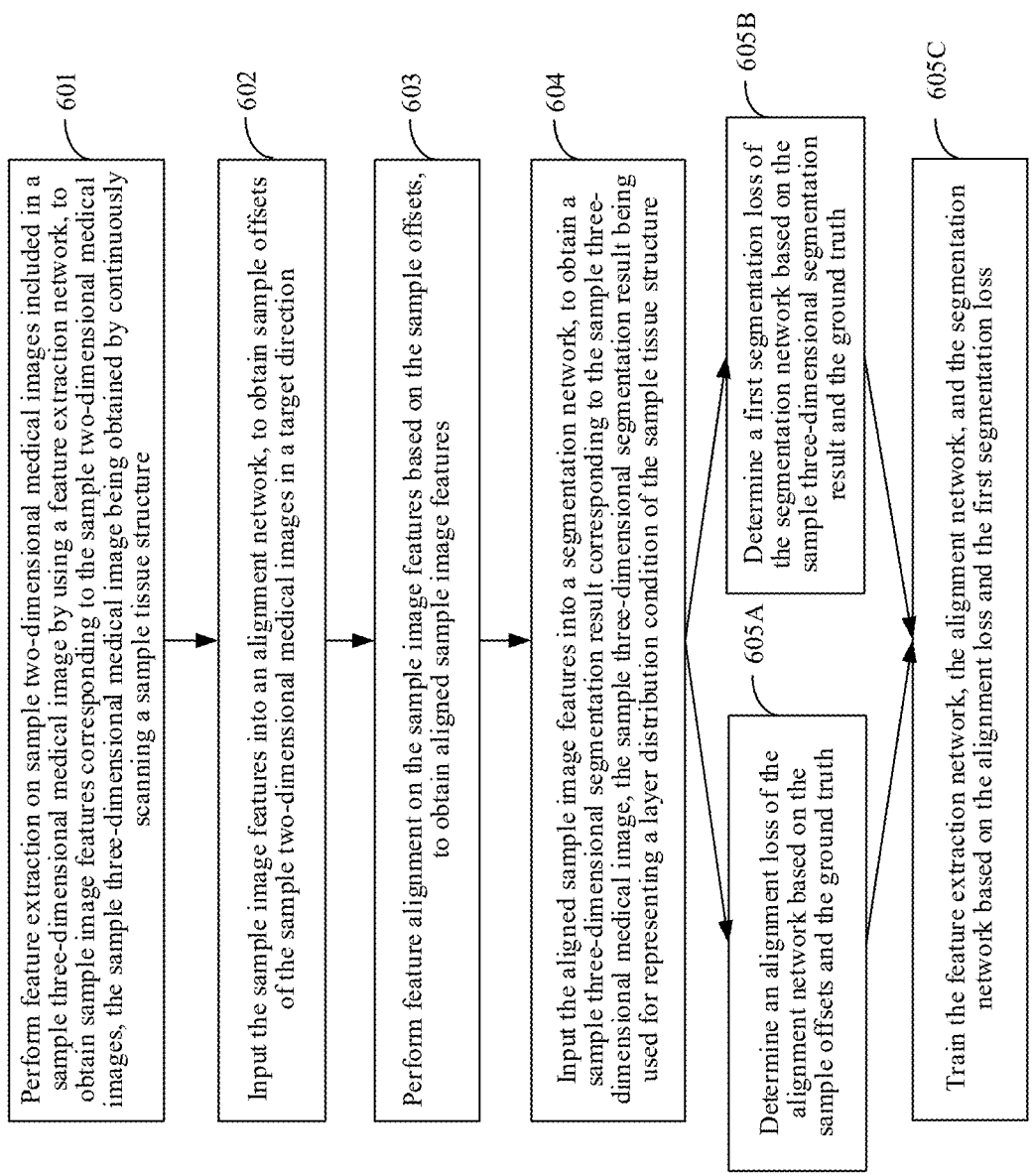
FIG. 7 is a flowchart of a method for performing layer segmentation on a tissue structure in a medical image according to another exemplary embodiment of this application.

In a possible implementation, a loss of the layer segmentation model is mainly formed by two parts, which are respectively an alignment loss of the alignment network and a segmentation loss of the segmentation network. As shown in FIG. 7, step 605 may include the following steps.

Step 605A. Determine an alignment loss of the alignment network based on the sample offsets and the ground truth.

After image alignment, there is similarity between adjacent sample two-dimensional medical images. Therefore, the computer device may perform image matching on the adjacent sample two-dimensional medical images, to determine an image alignment effect. In addition, for well aligned sample two-dimensional medical images, layer positions of tissue structures in the adjacent sample two-dimensional medical images are close. Therefore, the computer device may further determine the image alignment effect based on the layer positions labeled in the aligned sample two-dimensional medical images. In a possible implementation, this step may include the following steps.

1. Perform image alignment on the sample two-dimensional medical images based on the sample offsets.

The computer device adjusts the sample two-dimensional medical images in the target direction based on the sample offsets predicted by the alignment network, to implement image alignment.

2. Determine a normalized cross-correlation loss based on aligned adjacent sample two-dimensional medical images.

After completing image alignment, the computer device extracts adjacent sample two-dimensional medical images and determines a local normalized cross-correlation (NCC) loss between the two images. For example, the NCC loss may be represented as:

$$\mathcal{L}_{NCC} = \sum_{(b_i,b_j)\in N_B} \sum_{p\in \phi} \frac{\left(\sum_{p_k}(\hat{I}_{b_i}(p_k) - \bar{I}_{b_i}(p))(\hat{I}_{b_j}(p_k) - \bar{I}_{b_j}(p))\right)^2}{\left(\sum_{p_k}(\hat{I}_{b_1}(p_k) - \bar{I}_{b_i}(p))^2\right)\left(\sum_{p_k}(\hat{I}_{b_j}(p_k) - \bar{I}_{b_j}(p))^2\right)}$$

where $(b_i, b_j)$ represents adjacent sample two-dimensional medical images, $N_B$ is a set formed by the adjacent sample two-dimensional medical images, $\phi$ represents an image space, p represents a pixel in the image space, $$\bar{I}(p) = \hat{I}(p) - \frac{1}{n^2}\sum_{p_k}\hat{I}(p_k), \hat{I}(p)$$

represents a pixel in an aligned image, and $p_k$ represents $n^2$ pixels around the pixel.

3. Determine a first smooth loss based on a distance between same sample label points in the aligned adjacent sample two-dimensional medical images.

In a possible implementation, when the sample two-dimensional medical images are B-scan images, the computer device adjusts sample label points in a same A-scan column in two adjacent B-scan images based on the sample offsets, and determines a distance between two sample label points, to obtain a first smooth loss. A smaller first smooth loss indicates a smoother layer of the target tissue structure in the aligned image and a better alignment effect.

For example, the first smooth loss may be represented as:

$$\mathcal{L}_{SmoothA} = \sum_{(b_i,b_j)\in N_B} \sum_{a=1}^{N_A}\left(\left(r_{b_{i,a}}^g - d_{b_i}\right) - \left(r_{b_{j,a}}^g - d_{b_j}\right)\right)^2$$

where $(b_i, b_j)$ represents adjacent sample two-dimensional medical images, $N_B$ is a set formed by the adjacent sample two-dimensional medical images, $r_{b_{i,a}}^g$ represents a label on a layer position in an $a^{th}$ A-scan column in a $b_i^{th}$ sample two-dimensional medical image, $d_{b_i}$ represents an offset of the bath sample two-dimensional medical image, $r_{b_{j,a}}^g$ represents a label of a layer position in the $a^{th}$ A-scan column in a $b_j^{th}$ sample two-dimensional medical image, $d_{b_j}$ represents an offset of the $b_j^{th}$ sample two-dimensional medical image, and $N_A$ is a quantity of A-scan columns.

4. Determine the normalized cross-correlation loss and the first smooth loss as the alignment loss.

Figure 8:
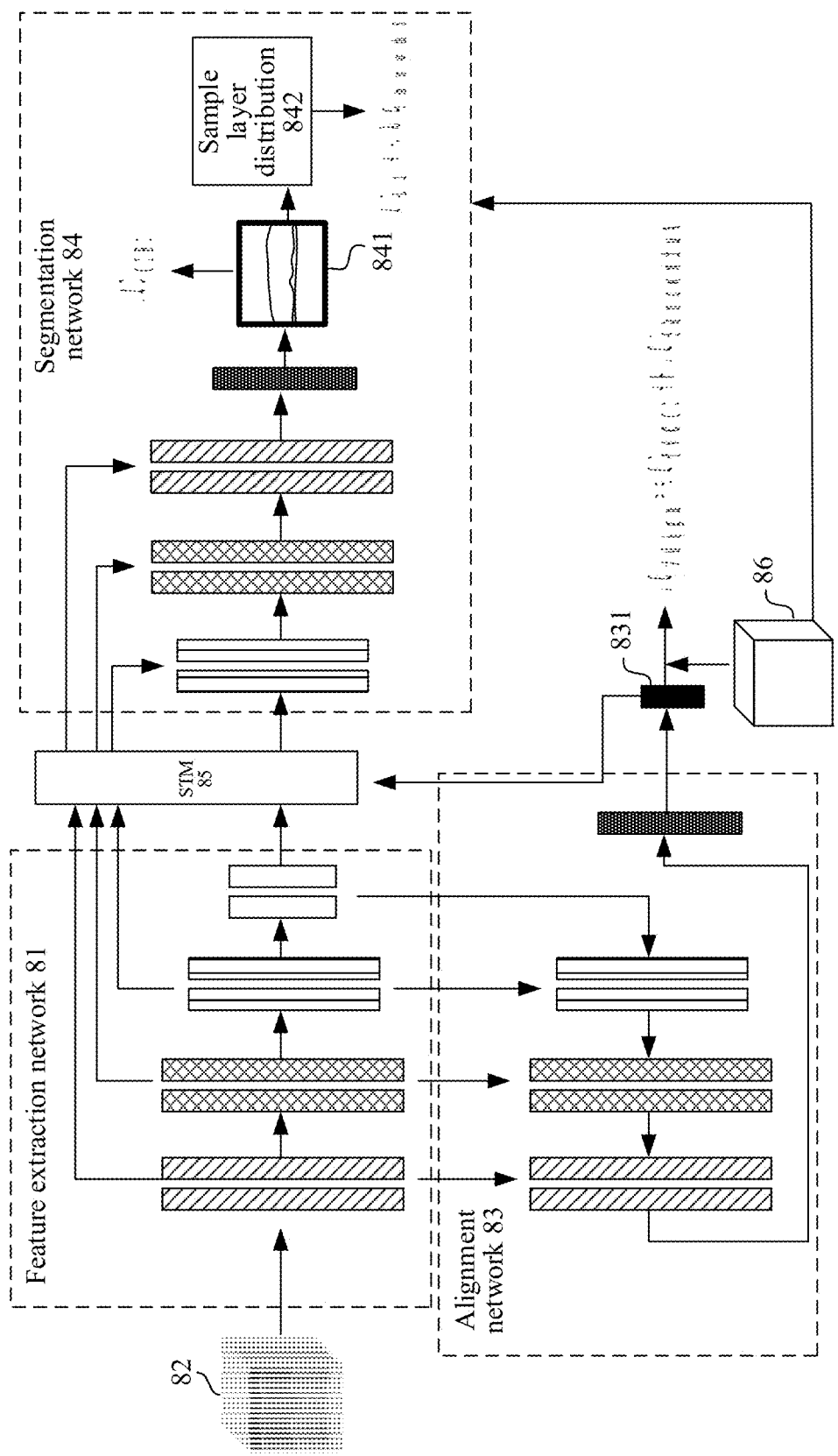
FIG. 8 is a schematic diagram of an implementation of a model training process according to an exemplary embodiment of this application.

Further, the computer device uses the NCC loss and the first smooth loss as the alignment loss of the alignment network, the alignment loss being represented as $\mathcal{L}_{Align} = \mathcal{L}_{NCC} + \mathcal{L}_{SmoothA}$:

For example, as shown in FIG. 8, after a feature extraction network 81 performs feature extraction on a sample three-dimensional medical image 82, an alignment network 83 performs prediction based on sample image features, to obtain sample offsets 831, and the computer device determines an alignment loss based on the sample offsets 831 and a ground truth 86.

Step 605B. Determine a first segmentation loss of the segmentation network based on the sample three-dimensional segmentation result and the ground truth.

In a possible implementation, the sample three-dimensional segmentation result is the sample layer distribution probability outputted by the segmentation network, and the determining, by the computer device, a first segmentation loss may include the following steps.

1. Determine a cross-entropy loss based on a sample layer distribution probability indicated by the sample three-dimensional segmentation result, the sample layer distribution probability being used for representing a probability of a position of each layer of the sample tissue structure in the sample three-dimensional medical image.

For example, when the sample two-dimensional medical images are B-scan images, the cross-entropy loss may be represented as:

$$\mathcal{L}_{CE} = -\sum_{b=1}^{N_B}\sum_{a=1}^{N_A}\sum_{r=1}^{R} 1(r_{b,a}^g = r)\log q_{b,a}(r_{b,a}^g|V, \theta)$$

where $q_{b,a}(r_{b,a}^g|V, \theta)$ is a sample layer distribution probability, $r_{b,a}^g$ represents a layer label in an $a^{th}$ A-scan column in a $b^{th}$ B-scan image, r is a pixel in the A-scan column, R is a number of rows of A-scan, 1(x) is an indicator function, and when x is true, a function value is 1, and when x is false, a function value is 0.

2. Generate sample layer distribution based on the sample layer distribution probability; and determine a first norm loss based on the sample layer distribution and labeled layer distribution indicated by the ground truth.

In a possible implementation, the computer device generates sample layer distribution based on the sample layer distribution probability and determines a distribution difference between the sample layer distribution and labeled layer distribution indicated by the ground truth, to obtain a first norm loss (L1) between the sample layer distribution and the labeled layer distribution, the first norm loss being used for guiding a predicted layer to approach a true value (that is, a labeled layer).

For example, the first norm loss may be represented as:

$$\mathcal{L}_{CE} = -\sum_{b=1}^{N_B}\sum_{a=1}^{N_A} 0.5 d_{b,1}^2 1(|d_{b,a}| < 1) + (|d_{b,a}| - 0.5) 1(|d_{b,a}| \geq 1)$$

where $d_{b,a} = \hat{r}_{b,a} - r_{b,a}^g$, $\hat{r}_{b,a}$ represents sample layer distribution, $\hat{r}_{b,a}$ is obtained through soft-argmax:

$$\hat{r}_{b,a} = \sum_{r=1}^{R} r q_{b,a}(r|V, \theta),$$

1(x) is an indicator function, and when x is true, a function value is 1, and when x is false, a function value is 0.

3. Determine a second smooth loss based on a position difference between adjacent points in the sample layer distribution.

In a possible implementation, by using prior information that the layers of the sample tissue structure have smooth curved surfaces, the computer device may determine a position difference between adjacent points in the sample layer distribution, and determine a second smooth loss by using a curved surface-approximate two-dimensional gradient as a constraint of the position difference, the second smooth loss being used for improving smoothness of a predicted layer.

For example, the second smooth loss may be represented as:

$$\mathcal{L}_{SmoothS} = \sum_{b=1}^{N_B}\sum_{a=1}^{N_A} \|\nabla S(b, a)\|^2$$

where $$\nabla S(b, a) = \frac{S(b+1, a) - S(b, a)}{\partial_z} + \frac{S(b, a+1) - S(b, a)}{\partial_x},$$

$\partial_z$ and $\partial_x$ respectively represent pixel distance in a z-axis direction and an x-axis direction in the sample three-dimensional medical image, and S is sample layer distribution.

4. Determine the cross-entropy loss, the first norm loss, and the second smooth loss as the first segmentation loss.

Further, the computer device uses the cross-entropy loss, the first norm loss, and the second smooth loss as the first segmentation loss of the segmentation network, and the first segmentation loss may be represented as:

$$\mathcal{L}_{Seg} = \mathcal{L}_{CE} + \mathcal{L}_{L1} + \lambda \mathcal{L}_{SmoothS}$$

where $\lambda$ is a hyperparameter used for controlling a weight of the second smooth loss.

In a possible implementation, for an eye OCT image, $\lambda$ corresponding to three retina layers ILM, IRPE, and OBM are respectively set to 0, 0.3, and 0.5.

For example, as shown in FIG. 8, an STM 85 inputs the sample image features after feature alignment into a segmentation network 84, to obtain a sample layer distribution probability 841 outputted by the segmentation network 84. The computer device determines a cross-entropy loss based on the sample layer distribution probability 841 and the ground truth 86. Further, the computer device generates sample layer distribution 842 based on the sample layer distribution probability 841 and further determines a first norm loss and a second smooth loss based on the sample layer distribution 842 and the ground truth 86.

Step 605C. Train the feature extraction network, the alignment network, and the segmentation network based on the alignment loss and the first segmentation loss.

Further, the computer device determines a total loss based on the alignment loss and the first segmentation loss, and trains the feature extraction network, the alignment network, and the segmentation network based on the total loss.

In a possible implementation, the segmentation network includes a first network output head and a second network output head, the first network output head is configured to output the sample three-dimensional segmentation result, and the second network output head is configured to output layer labels of layers to which pixels belong in an image. The addition of the second network output head may provide additional training tasks for the network, so that a better training effect can be achieved by using pixel-level supervision information (the second network output head is not required at an application stage).

In some embodiments, after inputting the aligned sample image features into the segmentation network, in addition to obtaining the sample three-dimensional segmentation result, the computer device further obtains a sample pixel label result corresponding to the sample three-dimensional medical image. Correspondingly, during training, the computer device trains the feature extraction network, the alignment network, and the segmentation network based on the sample offsets, the sample three-dimensional segmentation result, the sample pixel label result, and the ground truth.

The sample pixel label result may be represented by using a layer map.

When the loss is determined, in addition to determining the alignment loss and the first segmentation loss in the foregoing embodiments, the computer device may further determine a second segmentation loss of the segmentation network based on the sample pixel label result and the ground truth. In a possible implementation, the computer device uses Dice+the cross-entropy loss ($\mathcal{L}_{Dice+CE}$) as the second segmentation loss.

Figure 9:
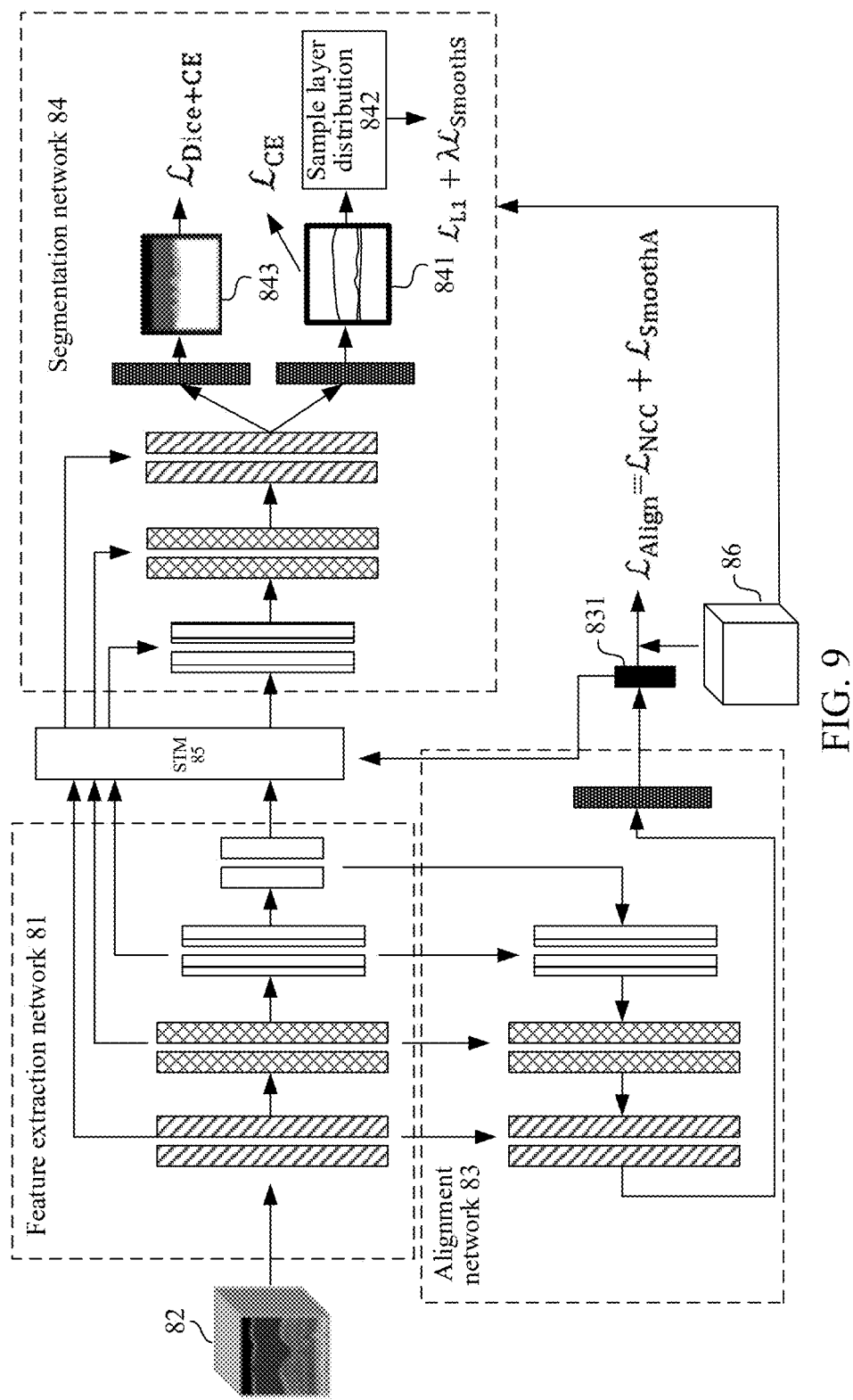
FIG. 9 is a schematic diagram of an implementation of a model training process according to another exemplary embodiment of this application.

For example, based on FIG. 8, as shown in FIG. 9, a second network output head of the segmentation network 84 outputs a sample pixel label result 843, and the computer device determines a second segmentation loss based on the sample pixel label result 843 and the ground truth 86.

Figure 10:
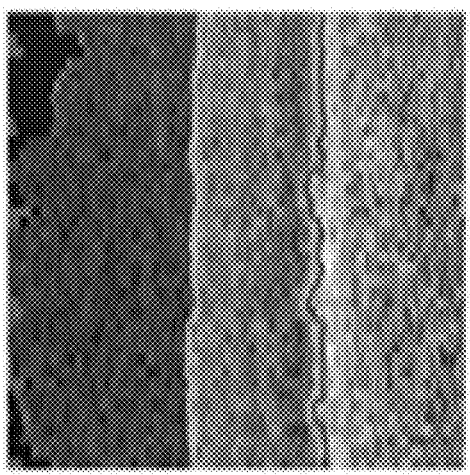
FIG. 10 is a diagram of comparison between B-scan image alignment effects in different solutions.
Figure 10:
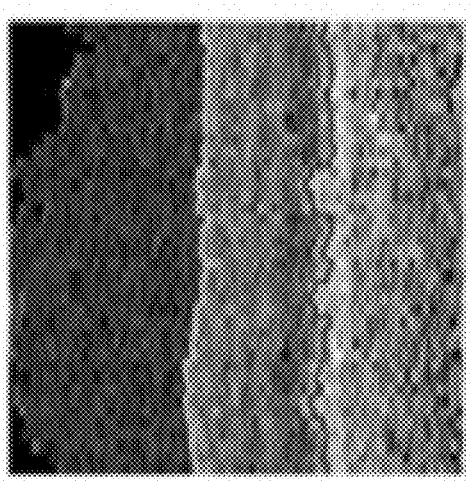
Figure 10:
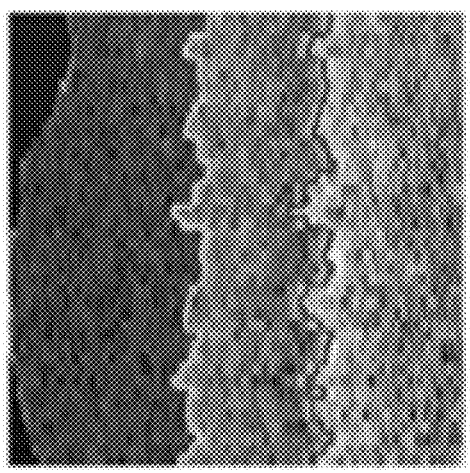

The layer segmentation model obtained through training by using the solution provided in the foregoing embodiments is applied to three-dimensional segmentation of the retina layer in the eye OCT image, to improve the smoothness of the retina layer obtained through segmentation. FIG. 10 is a diagram of comparison between B-scan image alignment effects in a related technical solution and a solution provided in this application. In Table 1, quantitative analysis is performed on an alignment result from two dimensions of a mean absolute distance (MAD) and a normalized cross-correlation (NCC) (a lower value indicates a better alignment effect).

TABLE 1

| Solution | ILM (MAD) | IRPE (MAD) | OBM (MAD) | Averaged (MAD) | NCC |
|---|---|---|---|---|---|
| Unaligned | 0.726 | 0.497 | 0.477 | 0.567 | 0.078 |
| Related technical solution | 0.557 | 0.328 | 0.329 | 0.404 | 0.082 |
| Solution in this application | 0.519 | 0.334 | 0.322 | 0.391 | 0.089 |

It can be obviously learned from FIG. 10 and Table 1 that by using the solution provided in the embodiments of this application, an alignment effect of the B-scan images may be obviously improved.

Table 2 shows data comparison between segmentation results of various solutions on a SD-OCT training data set. A mean absolute distance (MAD) is selected as an evaluation index and a variance is given

TABLE 2

| Solution | Related technical solution | Solution in this application | Unaligned | Pre-alignment | No smooth |
|---|---|---|---|---|---|
| ILM (AMD) | 1.73 (2.50) | 1.76 (2.39) | 2.25 (3.77) | 1.80 (2.36) | 1.68 (1.84) |
| IRPE (AMD) | 3.09 (2.09) | 3.04 (1.79) | 3.14 (1.72) | 3.09 (1.79) | 3.10 (1.97) |
| OBM (AMD) | 4.94 (5.35) | 4.43 (2.68) | 4.96 (3.26) | 4.75 (3.61) | 4.84 (3.43) |
| ILM (Normal) | 1.24 (0.51) | 1.26 (0.47) | 1.40 (0.42) | 1.30 (0.49) | 1.27 (0.47) |
| IRPE (Normal) | 2.06 (1.51) | 2.10 (1.36) | 2.18 (1.37) | 2.05 (1.40) | 2.13 (1.45) |
| OBM (Normal) | 2.28 (0.36) | 2.40 (0.39) | 2.49 (0.40) | 2.34 (0.37) | 2.45 (0.41) |
| Overall | 2.78 (3.31) | 2.71 (2.25) | 3.00 (2.82) | 2.77 (2.59) | 2.81 (2.48) |

It can be learned from Table 2 that a worst result is obtained by an experiment without any alignment algorithm, and it indicates that misalignment between B-scans can negatively affect three-dimensional segmentation of OCT data. In addition, after the alignment network is added, the technical solution in this application has a certain improvement compared with the pre-alignment solution, because the alignment result of the alignment network is slightly different in each round during network training, which is equivalent to data enhancement for the segmentation network, so that a better result can be obtained. In addition, the removal of the smooth loss reduces the effect of the technical solution in this application, which proves the effectiveness of using the prior information of retinal surface smoothing.

Figure 11:
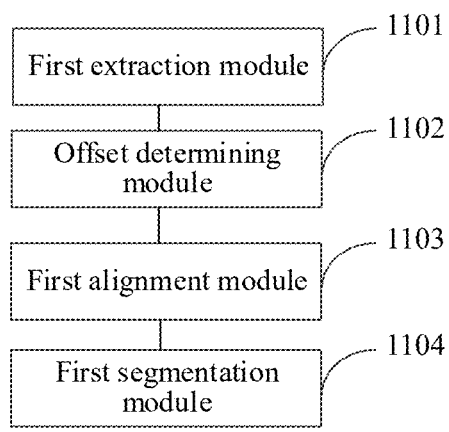
FIG. 11 is a structural block diagram of an apparatus for performing layer segmentation on a tissue structure in a medical image according to an exemplary embodiment of this application.

FIG. 11 is a structural block diagram of an apparatus for performing layer segmentation on a tissue structure in a medical image according to an exemplary embodiment of this application. The apparatus includes:

a first extraction module 1101, configured to perform feature extraction on two-dimensional medical images included in a three-dimensional medical image, to obtain image features corresponding to the two-dimensional medical images, the three-dimensional medical image being obtained by continuously scanning a target tissue structure;

an offset determining module 1102, configured to determine offsets of the two-dimensional medical images in a target direction based on the image features;

a first alignment module 1103, configured to perform feature alignment on the image features based on the offsets, to obtain aligned image features; and a first segmentation module 1104, configured to perform three-dimensional segmentation on the three-dimensional medical image based on the aligned image features, to obtain three-dimensional layer distribution of the target tissue structure in the three-dimensional medical image.

In some embodiments, the first extraction module 1101 is configured to:

perform feature extraction on the two-dimensional medical images by using a feature extraction network, to obtain at least two layers of the image features of the two-dimensional medical images, the feature extraction network being a two-dimensional convolutional neural network, and image features of different layers being obtained by performing feature extraction by different two-dimensional convolutional layers in the feature extraction network; and the first alignment module 1103 is configured to:

perform feature alignment on the image features of the layers based on the offsets, to obtain the aligned image features.

In some embodiments, the first alignment module 1103 is further configured to:

adjust the offsets based on feature sizes of the image features, to obtain adjusted offsets; and perform feature alignment on the image features based on the adjusted offsets, to obtain the aligned image features.

In some embodiments, the offset determining module 1102 is configured to:

input the image features of the layers into an alignment network, to obtain an offset vector outputted by the alignment network, the offset vector including the offsets of the two-dimensional medical images in the target direction, the alignment network being a three-dimensional convolutional neural network formed by three-dimensional convolutional layers, and the alignment network being in a skip-connection to the convolutional layers in the feature extraction network.

In some embodiments, the first segmentation module 1104 is configured to:
  input the aligned image features of the layers into a segmentation network, to obtain layer distribution probabilities outputted by the segmentation network, the layer distribution probabilities being used for representing probabilities of positions of layers of the target tissue structure in the three-dimensional medical image, the segmentation network being a three-dimensional convolutional neural network formed by three-dimensional convolutional layers, and the segmentation network being in a skip-connection to the convolutional layers in the feature extraction network; and
  generate the three-dimensional layer distribution of the target tissue structure based on the layer distribution probabilities.

In some embodiments, the first extraction module 1101 is configured to:
  perform feature extraction on the two-dimensional medical images layer by layer by using at least two two-dimensional convolutional layers included in the feature extraction network, to obtain a high-layer image feature outputted by a last two-dimensional convolutional layer and a lower-layer image feature outputted by another two-dimensional convolutional layer.

In some embodiments, the three-dimensional medical image is obtained by segmenting a complete medical image; and
  the apparatus further includes:
    a splicing module, configured to splice three-dimensional layer distribution of the three-dimensional medical images based on positions of the three-dimensional medical images in the complete medical image, to obtain complete three-dimensional layer distribution of the complete medical image.

In some embodiments, the three-dimensional medical image is an optical coherence tomography (OCT) image, the two-dimensional medical image is obtained by transverse scanning (B-scan), and the target direction is a longitudinal scanning (A-scan) direction.

Based on the foregoing, in this embodiment of this application, after feature extraction is performed on two-dimensional medical images in a three-dimensional medical image, offsets of the two-dimensional medical images caused by movement of a target tissue structure during continuous scanning are first determined based on image features, and feature alignment is performed on the image features based on the offsets, so that feature segmentation is performed on the three-dimensional medical image based on aligned image features, to obtain layer distribution of the target tissue structure in the three-dimensional medical image. By using the solution provided in this embodiment of this application, layer recognition at a three-dimensional layer can be implemented, and three-dimensional layer distribution of a tissue structure is segmented from the three-dimensional medical image, to provide more effective information for subsequent diagnosis, and improve the utilization of the medical image. In addition, feature alignment is performed on the image features before three-dimensional segmentation, so that offsets between images caused by movement of the target tissue structure can be eliminated during scanning, to improve accuracy of layer distribution obtained through segmentation.

Figure 12:
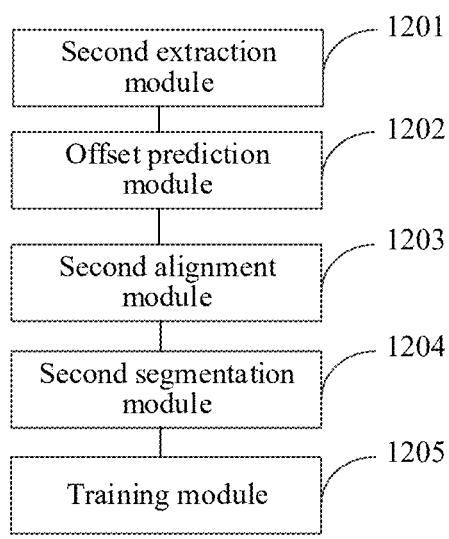
FIG. 12 is a structural block diagram of an apparatus for performing layer segmentation on a tissue structure in a medical image according to an exemplary embodiment of this application.

FIG. 12 is a structural block diagram of an apparatus for performing layer segmentation on a tissue structure in a medical image according to an exemplary embodiment of this application. The apparatus includes:
  a second extraction module 1201, configured to perform feature extraction on sample two-dimensional medical images included in a sample three-dimensional medical image by using a feature extraction network, to obtain sample image features corresponding to the sample two-dimensional medical images, the sample three-dimensional medical image being obtained by continuously scanning a sample tissue structure;
  an offset prediction module 1202, configured to input the sample image features into an alignment network, to obtain sample offsets of the sample two-dimensional medical images in a target direction;
  a second alignment module 1203, configured to perform feature alignment on the sample image features based on the sample offsets, to obtain aligned sample image features;
  a second segmentation module 1204, configured to input the aligned sample image features into a segmentation network, to obtain a sample three-dimensional segmentation result corresponding to the sample three-dimensional medical image, the sample three-dimensional segmentation result being used for representing a layer distribution condition of the sample tissue structure; and
  a training module 1205, configured to train the feature extraction network, the alignment network, and the segmentation network based on the sample offsets, the sample three-dimensional segmentation result, and a ground truth.

In some embodiments, the training module 1205 includes:
  a first loss determining unit, configured to determine an alignment loss of the alignment network based on the sample offsets and the ground truth;
  a second loss determining unit, configured to determine a first segmentation loss of the segmentation network based on the sample three-dimensional segmentation result and the ground truth; and
  a training unit, configured to train the feature extraction network, the alignment network, and the segmentation network based on the alignment loss and the first segmentation loss.

In some embodiments, the first loss determining unit is configured to:
  perform image alignment on the sample two-dimensional medical images based on the sample offsets;
  determine a normalized cross-correlation loss based on aligned adjacent sample two-dimensional medical images;
  determine a first smooth loss based on a distance between same sample label points in the aligned adjacent sample two-dimensional medical images; and
  determine the normalized cross-correlation loss and the first smooth loss as the alignment loss.

In some embodiments, the second loss determining unit is configured to:
  determine a cross-entropy loss based on a sample layer distribution probability indicated by the sample three-dimensional segmentation result, the sample layer distribution probability being used for representing a probability of a position of each layer of the sample tissue structure in the sample three-dimensional medical image;

generate sample layer distribution based on the sample layer distribution probability; determine a first norm loss based on the sample layer distribution and labeled layer distribution indicated by the ground truth;

determine a second smooth loss based on a position difference between adjacent points in the sample layer distribution; and determine the cross-entropy loss, the first norm loss, and the second smooth loss as the first segmentation loss.

In some embodiments, the second loss determining unit is configured to:

determine the position difference between the adjacent points in the sample layer distribution; and determine the second smooth loss by using a curved surface-approximate two-dimensional gradient as a constraint of the position difference.

In some embodiments, the segmentation network includes a first network output head and a second network output head. The first network output head is configured to output the sample three-dimensional segmentation result. The second network output head is configured to output layer labels of layers to which pixels belong in an image;

In some embodiments, the apparatus further includes:

a third segmentation module, configured to input the aligned sample image features into the segmentation network, to obtain a sample pixel label result corresponding to the sample three-dimensional medical image; and the training module 1205 is further configured to:

train the feature extraction network, the alignment network, and the segmentation network based on the sample offsets, the sample three-dimensional segmentation result, the sample pixel label result, and the ground truth.

In some embodiments, the training module 1205 includes:

a first loss determining unit, configured to determine an alignment loss of the alignment network based on the sample offsets and the ground truth;

a second loss determining unit, configured to determine a first segmentation loss of the segmentation network based on the sample three-dimensional segmentation result and the ground truth;

a third loss determining unit, configured to determine a second segmentation loss of the segmentation network based on the sample pixel label result and the ground truth; and a training unit, configured to train the feature extraction network, the alignment network, and the segmentation network based on the alignment loss, the first segmentation loss, and the second segmentation loss.

Based on the foregoing, in this embodiment of this application, after feature extraction is performed on two-dimensional medical images in a three-dimensional medical image, offsets of the two-dimensional medical images caused by movement of a target tissue structure during continuous scanning are first determined based on image features, and feature alignment is performed on the image features based on the offsets, so that feature segmentation is performed on the three-dimensional medical image based on aligned image features, to obtain layer distribution of the target tissue structure in the three-dimensional medical image. By using the solution provided in this embodiment of this application, layer recognition at a three-dimensional layer can be implemented, and three-dimensional layer distribution of a tissue structure is segmented from the three-dimensional medical image, to provide more effective information for subsequent diagnosis, and improve the utilization of the medical image. In addition, feature alignment is performed on the image features before three-dimensional segmentation, so that offsets between images caused by movement of the target tissue structure can be eliminated during scanning, to improve accuracy of layer distribution obtained through segmentation.

The apparatus provided in the foregoing embodiments is illustrated with an example of division of the foregoing functional modules. In actual application, the functions may be allocated to and completed by different functional modules according to requirements, that is, the internal structure of the apparatus is divided into different functional modules, to implement all or some of the functions described above. In addition, the apparatuses provided in the foregoing embodiments and the method embodiments fall within a same conception. For details of a specific implementation process, refer to the method embodiments. Details are not described herein again.

Figure 13:
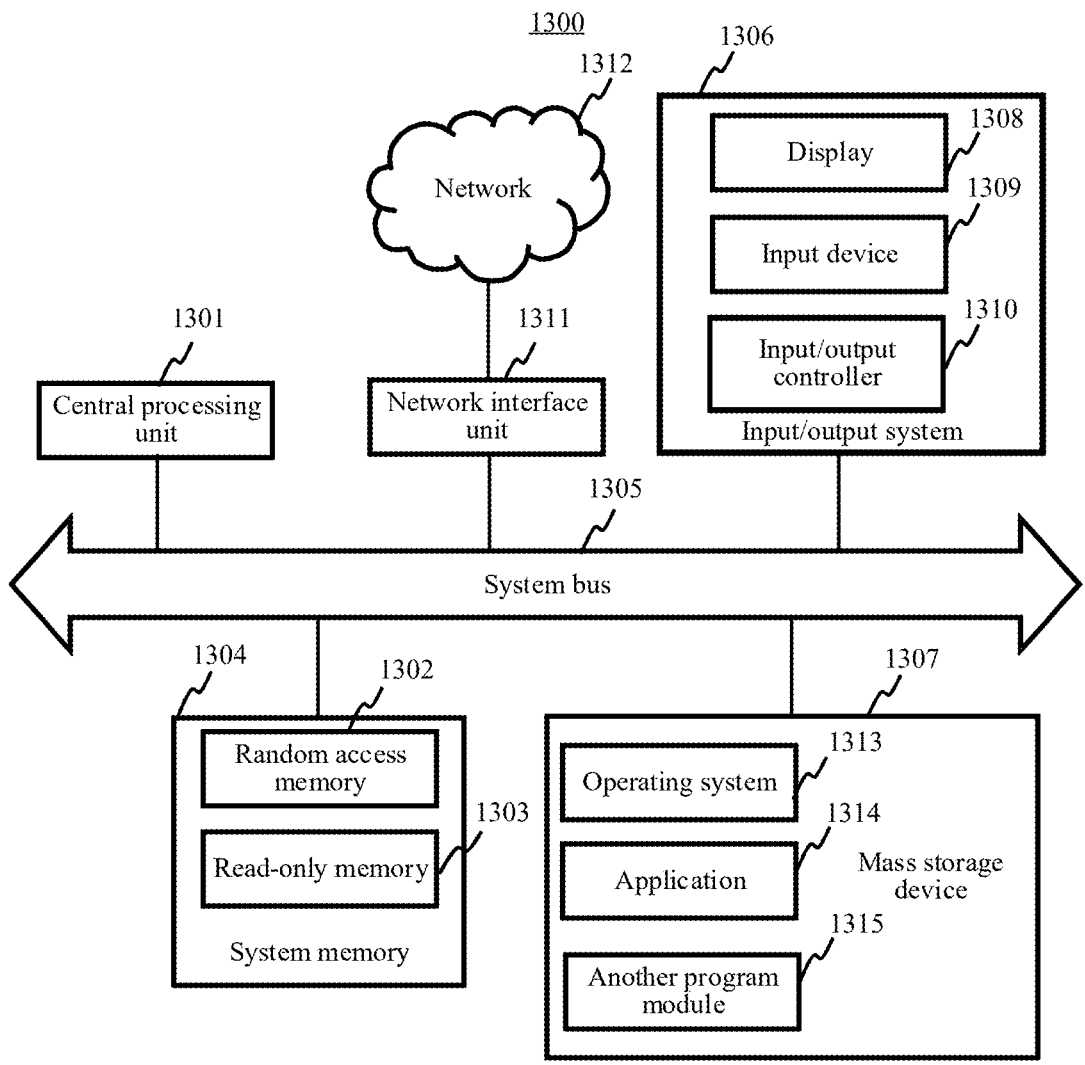
FIG. 13 is a schematic structural diagram of a computer device according to an exemplary embodiment of this application.

FIG. 13 is a schematic structural diagram of a computer device according to an exemplary embodiment of this application. Specifically, the computer device 1300 includes a central processing unit (CPU) 1301, a system memory 1304 including a random access memory (RAM) 1302 and a read-only memory (ROM) 1303, and a system bus 1305 connecting the system memory 1304 and the CPU 1301. The computer device 1300 further includes a basic input/output (I/O) system 1306 assisting in transmitting information between components in a computer, and a mass storage device 1307 configured to store an operating system 1313, an application program 1314, and another program module 1315.

The basic I/O system 1306 includes a display 1308 configured to display information and an input device 1309 such as a mouse or a keyboard that is configured to input information by a user. The display 1308 and the input device 1309 are both connected to the central processing unit 1301 through an input/output controller 1310 connected to the system bus 1305. The basic I/O system 1306 may further include the I/O controller 1310 for receiving and processing input from a plurality of other devices such as a keyboard, a mouse, an electronic stylus, or the like. Similarly, the input/output controller 1310 further provides output to a display screen, a printer, or other types of output devices.

The mass storage device 1307 is connected to the central processing unit 1301 through a mass storage controller (not shown) connected to the system bus 1305. The large-capacity storage device 1307 and an associated non-transitory computer-readable medium provide non-volatile storage for the computer device 1300. That is, the mass storage device 1307 may include a computer-readable medium (not shown), such as a hard disk or a drive.

Without loss of generality, the computer-readable medium may include a computer storage medium and a communication medium. The computer-storage medium includes volatile and non-volatile media, and removable and non-removable media implemented by using any method or technology used for storing information such as computer-readable instructions, data structures, program modules, or other data. The computer storage medium includes a random access memory (RAM), a read-only memory (ROM), a flash memory or another storage technology, a compact disc read-only memory (CD-ROM), a digital video disc (DVD) or other optical disc storage, a magnetic cartridge, a magnetic tape, disk storage, or another magnetic storage device. Certainly, it may be known by a person skilled in the art that the computer storage medium is not limited to the foregoing several types. The system memory 1304 and the mass storage device 1307 may be collectively referred to as a memory.

The memory stores one or more programs, and the one or more programs are configured to be executed by one or more CPUs 1301. The one or more programs comprise instructions used for implementing the foregoing method, and the CPU 1301 executes the one or more programs to implement the method provided in the foregoing method embodiments.

According to the various embodiments of this application, the computer device 1300 may further be connected, through a network such as the Internet, to a remote computer on the network for running. That is, the computer device 1300 may be connected to a network 1312 by using a network interface unit 1311 connected to the system bus 1305, or may be connected to another type of network or a remote computer system (not shown) by using a network interface unit 1311.

The memory further includes one or more programs. The one or more programs are stored in the memory and comprise steps to be executed by the computer device in the method provided in the embodiments of this application.

The embodiments of this application further provide a non-transitory computer-readable storage medium, storing at least one instruction, the at least one instruction being loaded and executed by a processor to implement the foregoing method for performing layer segmentation on a tissue structure in a medical image according to any one of the embodiments.

In some embodiments, the computer-readable storage medium may include: a ROM, a RAM, a solid state drive (SSD), an optical disc, or the like. The RAM may include a resistance RAM (ReRAM) and a dynamic RAM (DRAM).

The embodiments of this application provide a computer program product or a computer program. The computer program product or the computer program includes computer instructions, and the computer instructions are stored in a computer-readable storage medium. A processor of a computer device reads the computer instructions from the computer-readable storage medium. The processor executes the computer instructions, to cause the computer device to perform the method for performing layer segmentation on a tissue structure in a medical image according to the foregoing embodiments.

A person of ordinary skill in the art may understand that all or some of the steps of the method embodiments may be implemented by hardware or a program instructing relevant hardware. The program may be stored in a computer-readable storage medium. The storage medium mentioned above may be a ROM, a magnetic disk, or an optical disc.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs feature extraction and/or offset determination. In practical application, the foregoing functions may be allocated to and completed by different functional modules according to requirements, that is, an inner structure of a device is divided into different functional modules to implement all or a part of the functions described above.

What is claimed is:

1. A method for performing layer segmentation on a tissue structure in a medical image, performed by a computer device, the method comprising:
    obtaining a three-dimensional medical image corresponding to a target tissue structure;
    performing feature extraction on two-dimensional medical images included in the three-dimensional medical image, to obtain image features corresponding to the two-dimensional medical images;
    determining offsets of the two-dimensional medical images in a target direction based on the image features;
    performing feature alignment on the image features based on the offsets, to obtain aligned image features; and
    performing three-dimensional segmentation on the three-dimensional medical image based on the aligned image features, to obtain three-dimensional layer distribution of the target tissue structure in the three-dimensional medical image.

2. The method according to claim 1, wherein performing feature extraction on the two-dimensional medical images includes:
    performing feature extraction on the two-dimensional medical images by using a feature extraction network, to obtain at least two layers of the image features of the two-dimensional medical images, wherein the feature extraction network is a two-dimensional convolutional neural network, and image features of different layers are obtained by performing feature extraction by different two-dimensional convolutional layers in the feature extraction network.

3. The method according to claim 2, wherein performing feature alignment on the image features based on the offsets, to obtain aligned image features comprises:
    performing feature alignment on the at least two layers of the image features of the layers based on the offsets, to obtain the aligned image features.

4. The method according to claim 3, wherein performing feature alignment on the at least two layers of the image features of the layers based on the offsets, to obtain the aligned image features comprises:
    adjusting the offsets based on feature sizes of the image features, to obtain adjusted offsets; and
    performing feature alignment on the image features based on the adjusted offsets, to obtain the aligned image features.

5. The method according to claim 2, wherein determining the offsets of the two-dimensional medical images in the target direction based on the image features comprises:

inputting the image features of the layers into an alignment network, to obtain an offset vector output by the alignment network, the offset vector comprising the offsets of the two-dimensional medical images in the target direction, wherein the alignment network is a three-dimensional convolutional neural network formed by three-dimensional convolutional layers, and the alignment network being in a skip-connection to the convolutional layers in the feature extraction network.

6. The method according to claim 2, wherein performing three-dimensional segmentation on the three-dimensional medical image based on the aligned image features, to obtain three-dimensional layer distribution of the target tissue structure in the three-dimensional medical image comprises:
inputting the aligned image features of the layers into a segmentation network, to obtain layer distribution probabilities outputted by the segmentation network, the layer distribution probabilities being used for representing probabilities of positions of layers of the target tissue structure in the three-dimensional medical image, the segmentation network being a three-dimensional convolutional neural network formed by three-dimensional convolutional layers, and the segmentation network being in a skip-connection to the convolutional layers in the feature extraction network; and
generating the three-dimensional layer distribution of the target tissue structure based on the layer distribution probabilities.

7. The method according to claim 2, wherein performing feature extraction on the two-dimensional medical image by using the feature extraction network, to obtain at least two layers of the image features of the two-dimensional medical images comprises:
performing feature extraction on the two-dimensional medical images layer by layer by using at least two two-dimensional convolutional layers comprised in the feature extraction network, to obtain a high-layer image feature outputted by a last two-dimensional convolutional layer and a lower-layer image feature outputted by another two-dimensional convolutional layer.

8. The method according to claim 1, wherein:
the three-dimensional medical image is obtained by segmenting a complete medical image; and
the method further comprises after performing the three-dimensional segmentation on the three-dimensional medical image based on the aligned image features, to obtain three-dimensional layer distribution of the target tissue structure in the three-dimensional medical image:
splicing three-dimensional layer distribution of the three-dimensional medical images based on positions of the three-dimensional medical images in the complete medical image, to obtain complete three-dimensional layer distribution of the complete medical image.

9. The method according to claim 1, wherein the three-dimensional medical image is an optical coherence tomography (OCT) image, the two-dimensional medical image is obtained by transverse scanning, and the target direction is a longitudinal scanning direction.

10. A computer device for performing layer segmentation on a tissue structure in a medical image, comprising:
one or more processors; and
memory storing one or more programs, the one or more programs comprising instructions that, when executed by the one or more processors, cause the one or more processors to perform operations including:
obtaining a three-dimensional medical image corresponding to a target tissue structure;
performing feature extraction on two-dimensional medical images included in the three-dimensional medical image, to obtain image features corresponding to the two-dimensional medical images;
determining offsets of the two-dimensional medical images in a target direction based on the image features;
performing feature alignment on the image features based on the offsets, to obtain aligned image features; and
performing three-dimensional segmentation on the three-dimensional medical image based on the aligned image features, to obtain three-dimensional layer distribution of the target tissue structure in the three-dimensional medical image.

11. The computer device according to claim 10, wherein performing feature extraction on the two-dimensional medical images includes:
performing feature extraction on the two-dimensional medical images by using a feature extraction network, to obtain at least two layers of the image features of the two-dimensional medical images, wherein the feature extraction network is a two-dimensional convolutional neural network, and image features of different layers are obtained by performing feature extraction by different two-dimensional convolutional layers in the feature extraction network.

12. The computer device according to claim 11, wherein performing feature alignment on the image features based on the offsets, to obtain aligned image features comprises:
performing feature alignment on the at least two layers of the image features of the layers based on the offsets, to obtain the aligned image features.

13. The computer device according to claim 12, wherein performing feature alignment on the at least two layers of the image features of the layers based on the offsets, to obtain the aligned image features comprises:
adjusting the offsets based on feature sizes of the image features, to obtain adjusted offsets; and
performing feature alignment on the image features based on the adjusted offsets, to obtain the aligned image features.

14. The computer device according to claim 11, wherein determining the offsets of the two-dimensional medical images in the target direction based on the image features comprises:
inputting the image features of the layers into an alignment network, to obtain an offset vector output by the alignment network, the offset vector comprising the offsets of the two-dimensional medical images in the target direction, wherein the alignment network is a three-dimensional convolutional neural network formed by three-dimensional convolutional layers, and the alignment network being in a skip-connection to the convolutional layers in the feature extraction network.

15. The computer device according to claim 11, wherein performing three-dimensional segmentation on the three-dimensional medical image based on the aligned image features, to obtain three-dimensional layer distribution of the target tissue structure in the three-dimensional medical image comprises:
inputting the aligned image features of the layers into a segmentation network, to obtain layer distribution probabilities outputted by the segmentation network, the layer distribution probabilities being used for representing probabilities of positions of layers of the target tissue structure in the three-dimensional medical image, the segmentation network being a three-dimensional convolutional neural network formed by three-dimensional convolutional layers, and the segmentation network being in a skip-connection to the convolutional layers in the feature extraction network; and generating the three-dimensional layer distribution of the target tissue structure based on the layer distribution probabilities.

16. The computer device according to claim 11, wherein performing feature extraction on the two-dimensional medical image by using the feature extraction network, to obtain at least two layers of the image features of the two-dimensional medical images comprises:

performing feature extraction on the two-dimensional medical images layer by layer by using at least two two-dimensional convolutional layers comprised in the feature extraction network, to obtain a high-layer image feature outputted by a last two-dimensional convolutional layer and a lower-layer image feature outputted by another two-dimensional convolutional layer.

17. A non-transitory computer-readable storage medium, storing one or more instructions, the one or more instructions, when executed by one or more processors of a computer device, cause the computer device to perform operations comprising:

obtaining a three-dimensional medical image corresponding to a target tissue structure;

performing feature extraction on two-dimensional medical images included in the three-dimensional medical image, to obtain image features corresponding to the two-dimensional medical images;

determining offsets of the two-dimensional medical images in a target direction based on the image features;

performing feature alignment on the image features based on the offsets, to obtain aligned image features; and performing three-dimensional segmentation on the three-dimensional medical image based on the aligned image features, to obtain three-dimensional layer distribution of the target tissue structure in the three-dimensional medical image.

18. The non-transitory computer-readable storage medium according to claim 17, wherein performing feature extraction on the two-dimensional medical images includes:

performing feature extraction on the two-dimensional medical images by using a feature extraction network, to obtain at least two layers of the image features of the two-dimensional medical images, wherein the feature extraction network is a two-dimensional convolutional neural network, and image features of different layers are obtained by performing feature extraction by different two-dimensional convolutional layers in the feature extraction network.

19. The non-transitory computer-readable storage medium according to claim 17, wherein:

the three-dimensional medical image is obtained by segmenting a complete medical image; and the operations further include after performing the three-dimensional segmentation on the three-dimensional medical image based on the aligned image features, to obtain three-dimensional layer distribution of the target tissue structure in the three-dimensional medical image:

splicing three-dimensional layer distribution of the three-dimensional medical images based on positions of the three-dimensional medical images in the complete medical image, to obtain complete three-dimensional layer distribution of the complete medical image.

20. The non-transitory computer-readable storage medium according to claim 17, wherein the three-dimensional medical image is an optical coherence tomography (OCT) image, the two-dimensional medical image is obtained by transverse scanning, and the target direction is a longitudinal scanning direction.

* * * * *